United States Patent
Inata et al.

(10) Patent No.: US 9,501,146 B2
(45) Date of Patent: Nov. 22, 2016

(54) ELECTRONIC DEVICE

(71) Applicant: Panasonic Corporation, Osaka (JP)

(72) Inventors: Masahiro Inata, Hyogo (JP); Yusuke Adachi, Osaka (JP); Akira Koga, Osaka (JP); Ryo Okumura, Osaka (JP); Naoto Yumiki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 113 days.

(21) Appl. No.: 13/960,019

(22) Filed: Aug. 6, 2013

(65) Prior Publication Data

US 2013/0314355 A1 Nov. 28, 2013

Related U.S. Application Data

(63) Continuation of application No. PCT/JP2012/000884, filed on Feb. 9, 2012.

(30) Foreign Application Priority Data

Feb. 9, 2011 (JP) .................................. 2011-025740

(51) Int. Cl.
*G06F 3/041* (2006.01)
*G06F 3/01* (2006.01)
(Continued)

(52) U.S. Cl.
CPC .............. *G06F 3/016* (2013.01); *G06F 1/1626* (2013.01); *G06F 3/0416* (2013.01); *G06F 3/0488* (2013.01)

(58) Field of Classification Search
CPC .......... G06F 3/01; G06F 3/016; G06F 3/041; G06F 3/0412; G06F 3/0416; G06F 3/0488; G06F 2203/014

USPC ........................................................ 345/173
See application file for complete search history.

(56) References Cited

U.S. PATENT DOCUMENTS

| 7,292,227 B2 | 11/2007 | Fukumoto et al. |
| 7,728,819 B2 * | 6/2010 | Inokawa ................. G06F 3/016 |
| | | 178/18.05 |
| 8,232,969 B2 * | 7/2012 | Grant et al. ................... 345/173 |

(Continued)

FOREIGN PATENT DOCUMENTS

| JP | 2002-149312 A | 5/2002 |
| JP | 2006-157642 A | 6/2006 |

(Continued)

OTHER PUBLICATIONS

International Search Report for corresponding International Application No. PCT/JP2012/000884 mailed Apr. 24, 2012.

(Continued)

*Primary Examiner* — Jason Mandeville
(74) *Attorney, Agent, or Firm* — Renner, Otto, Boisselle & Sklar, LLP

(57) ABSTRACT

An exemplary electronic device includes: a housing; a display configured to display an operation area; a touch screen panel configured to detect at least an input operation made by a user to the operation area; a first vibrator configured to vibrate at least one of the display and the touch screen panel; a second vibrator configured to vibrate the housing; and a vibration controller configured to control vibration of the first vibrator and the second vibrator in accordance with the input operation of the user to the touch screen panel.

13 Claims, 24 Drawing Sheets

(51) Int. Cl.
*G06F 1/16* (2006.01)
*G06F 3/0488* (2013.01)

(56) References Cited

U.S. PATENT DOCUMENTS

| | | | | |
|---|---|---|---|---|
| 2003/0117377 | A1* | 6/2003 | Horie | G06F 3/0346 345/173 |
| 2006/0119589 | A1* | 6/2006 | Rosenberg et al. | 345/173 |
| 2006/0146032 | A1 | 7/2006 | Kajimoto et al. | |
| 2006/0152497 | A1* | 7/2006 | Rekimoto | 345/173 |
| 2009/0051667 | A1* | 2/2009 | Park et al. | 345/173 |
| 2010/0073304 | A1 | 3/2010 | Grant et al. | |
| 2010/0141410 | A1 | 6/2010 | Aono et al. | |
| 2010/0238116 | A1* | 9/2010 | Shin | 345/168 |
| 2010/0267424 | A1* | 10/2010 | Kim et al. | 455/566 |
| 2011/0157052 | A1* | 6/2011 | Lee | G06F 1/1626 345/173 |
| 2011/0285653 | A1* | 11/2011 | Kojima | G06F 3/016 345/173 |
| 2012/0083260 | A1 | 4/2012 | Arriola et al. | |

FOREIGN PATENT DOCUMENTS

| | | | |
|---|---|---|---|
| JP | 2008-017327 | A | 1/2008 |
| JP | 2008-181365 | A | 8/2008 |
| JP | 2010-061493 | A | 3/2010 |
| JP | 2011-0228811 | A | 2/2011 |
| JP | 2011 0228811 | A | 2/2011 |

OTHER PUBLICATIONS

Form PCT/ISA/237 for corresponding International Application No. PCT/JP2012/000884 dated Apr. 24, 2012 and partial English translation.

Notice of Reasons for Rejection for Japanese Patent Application No. 2012-528167 which is a national phase application of PCT/JP2012/000884 and full English translation.

Notice of Reasons for Rejection for corresponding Patent Application No. 2012-528167 and English translation mailed Feb. 4, 2014.

* cited by examiner

*FIG. 7*

|  | MOVE OF TOUCHED POSITION | TOUCH DURATION |
|---|---|---|
| CLICK OPERATION | NO | SHORT |
| LONG TAP OPERATION | NO | LONG |
| SLIDE OPERATION | YES | LONG |
| FLICK OPERATION | YES | SHORT |

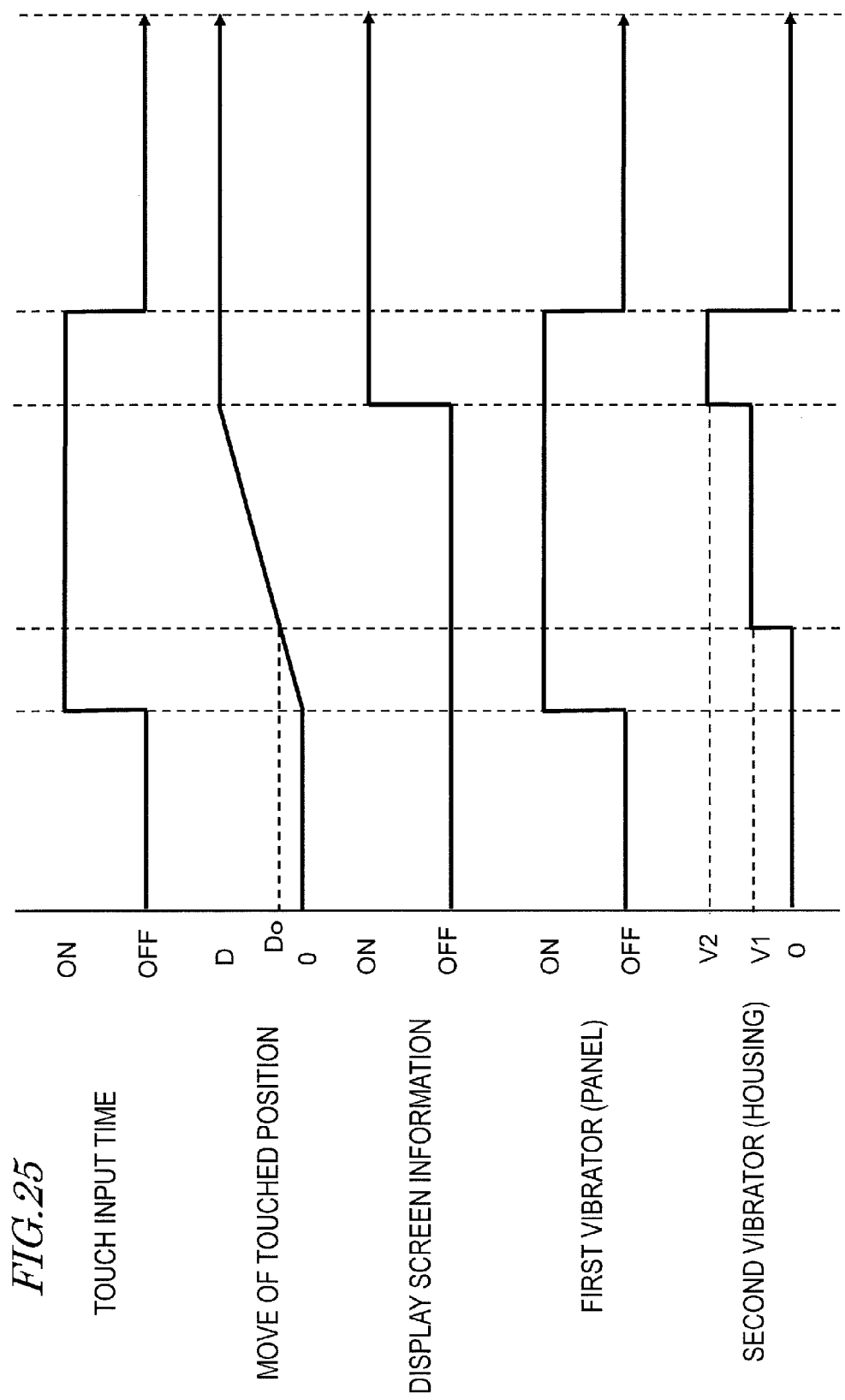

ELECTRONIC DEVICE

This is a continuation of International Application No. PCT/JP2012/000884, with an international filing date of Feb. 9, 2012, which claims priority of Japanese Patent Application No. 2011-025740, filed on Feb. 9, 2011, the contents of which are hereby incorporated by reference.

BACKGROUND

1. Technical Field

The present disclosure relates to an electronic device which generates vibration in response to a touch operation by a user.

2. Description of the Related Art

In electronic devices having a touch screen panel (hereinafter also referred to as "touch panel") disposed on a display screen, techniques of enhancing the user operability are known which involve vibrating the touch screen panel to provide a tactile sensation for the user.

For example, Japanese Laid-Open Patent Publication No. 2008-181365 discloses a portable device having a vibration element attached to a housing.

In the portable device of Japanese Laid-Open Patent Publication No. 2008-181365, the vibration element merely vibrates, and no special change is introduced in the vibration which is felt by a user performing a touch operation.

SUMMARY

The prior art technique needs further improvement in view of various tactile sensations in accordance with a user's touch operation.

One non-limiting, and exemplary embodiment provides a technique to provide an electronic device which is capable of presenting various tactile sensations in accordance with a user's touch operation.

In one general aspect, an electronic device according to an embodiment of the present disclosure comprises: a housing; a display configured to display an operation area; a touch screen panel configured to detect at least an input operation made by a user to the operation area; a first vibrator configured to vibrate at least one of the display and the touch screen panel; a second vibrator configured to vibrate the housing; and a vibration controller configured to control vibration of the first vibrator and the second vibrator, in accordance with the input operation of the user to the touch screen panel.

According to the above aspect, since the plurality of vibrators vibrate respectively different targets, it is possible to present various tactile sensations which are adapted to the touch operation by the user.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 7 is a diagram summarizing a relationship between touch operation patterns to a touch panel of an electronic device according to Embodiment 1, changes in touched position on the touch panel, and touch duration.

FIG. 25 is an operation timing diagram during a slide operation according to Embodiment 3.

DETAILED DESCRIPTION

An electronic device according to the present disclosure includes a first vibrator configured to vibrate at least one of a display and a touch screen panel, a second vibrator configured to vibrate a housing, and a vibration controller configured to control the vibration of the first vibrator and the second vibrator in accordance with a user's input operation to the touch screen panel. Since the vibration controller allows the plurality of vibrators to vibrate respectively different targets, it is possible to present various tactile sensations which are adapted to a touch operation by a user.

Hereinafter, with reference to the attached drawings, embodiments of the electronic device according to the present disclosure will be described.

(Embodiment 1)

<Overall Construction of Electronic Device>

Figure 1:
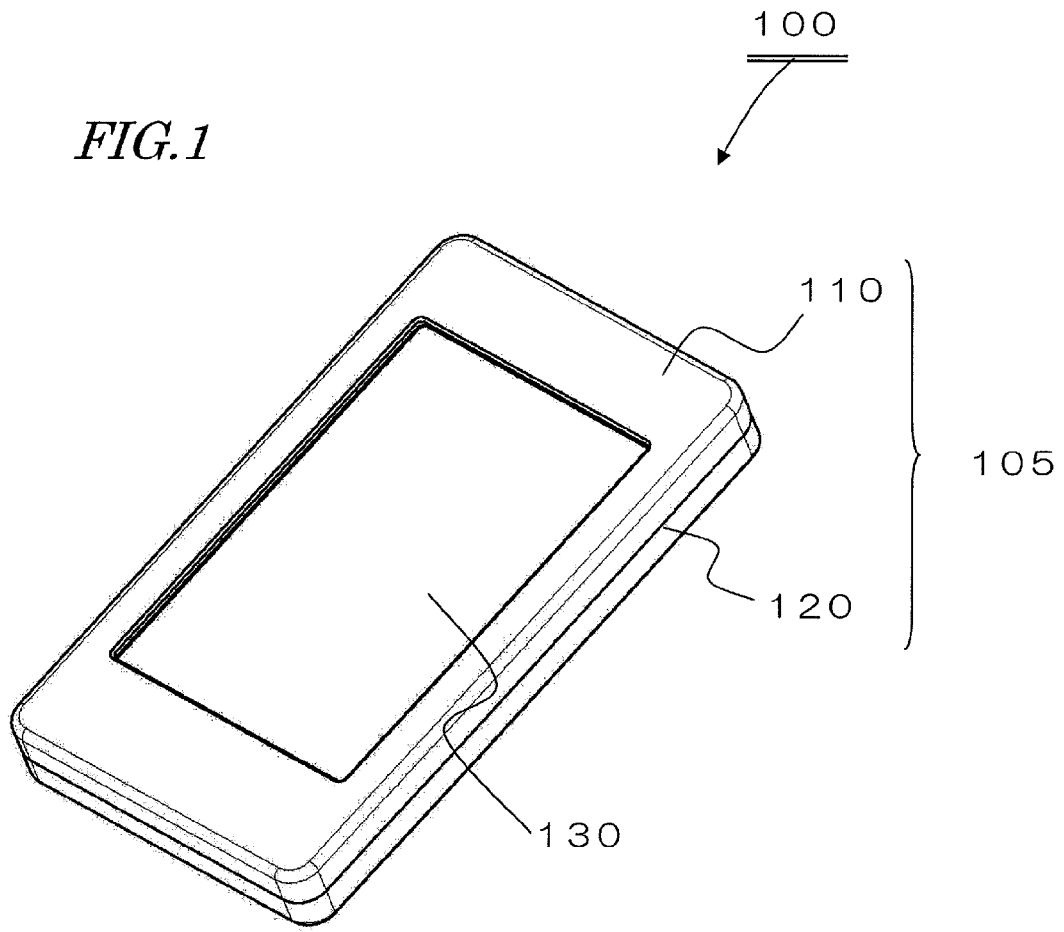
FIG. 1 is a perspective view showing an overall construction of an electronic device according to Embodiment 1.
Figure 2:
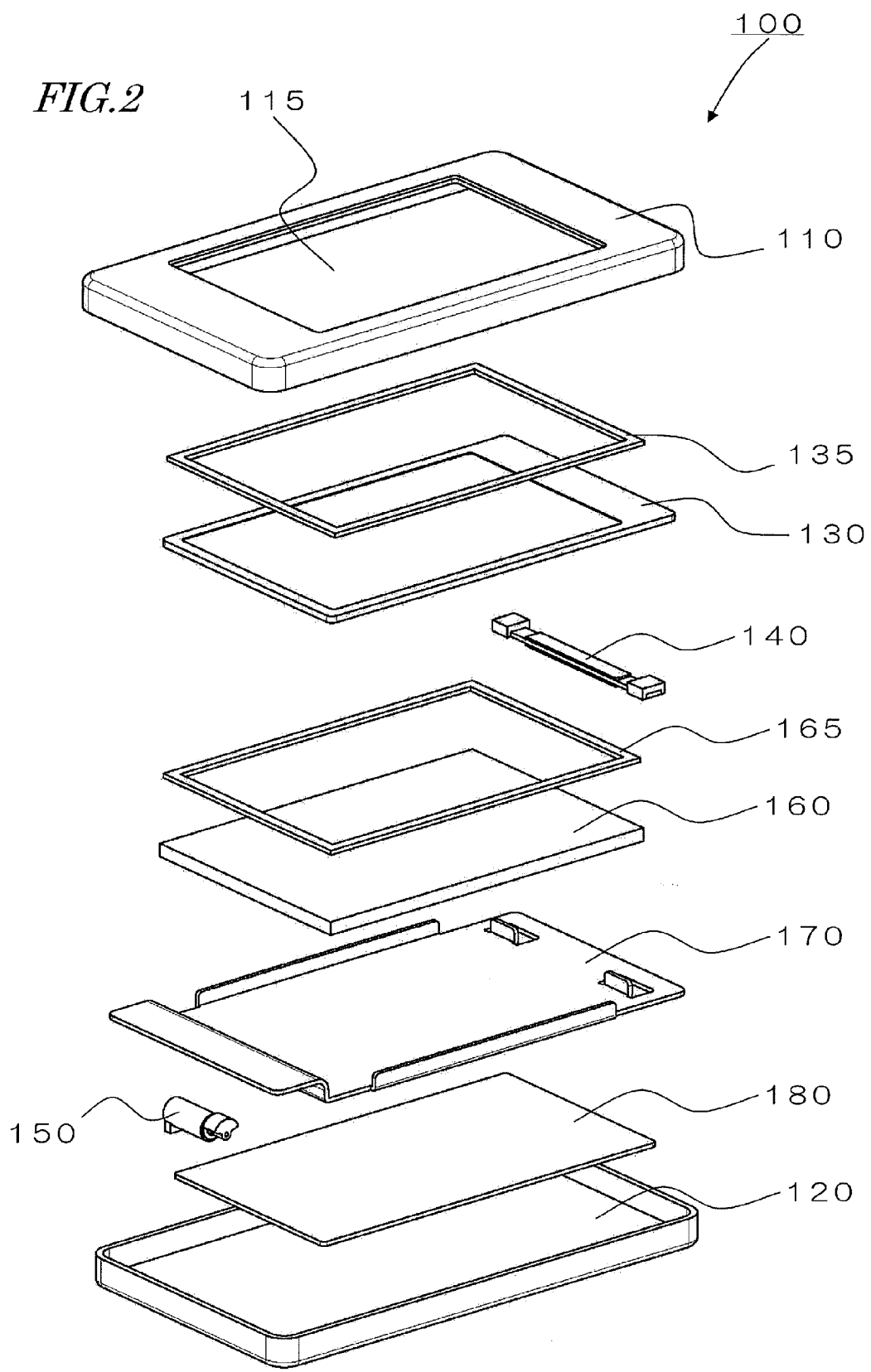
FIG. 2 is a block diagram schematically showing an electronic device according to Embodiment 1.
Figure 3:
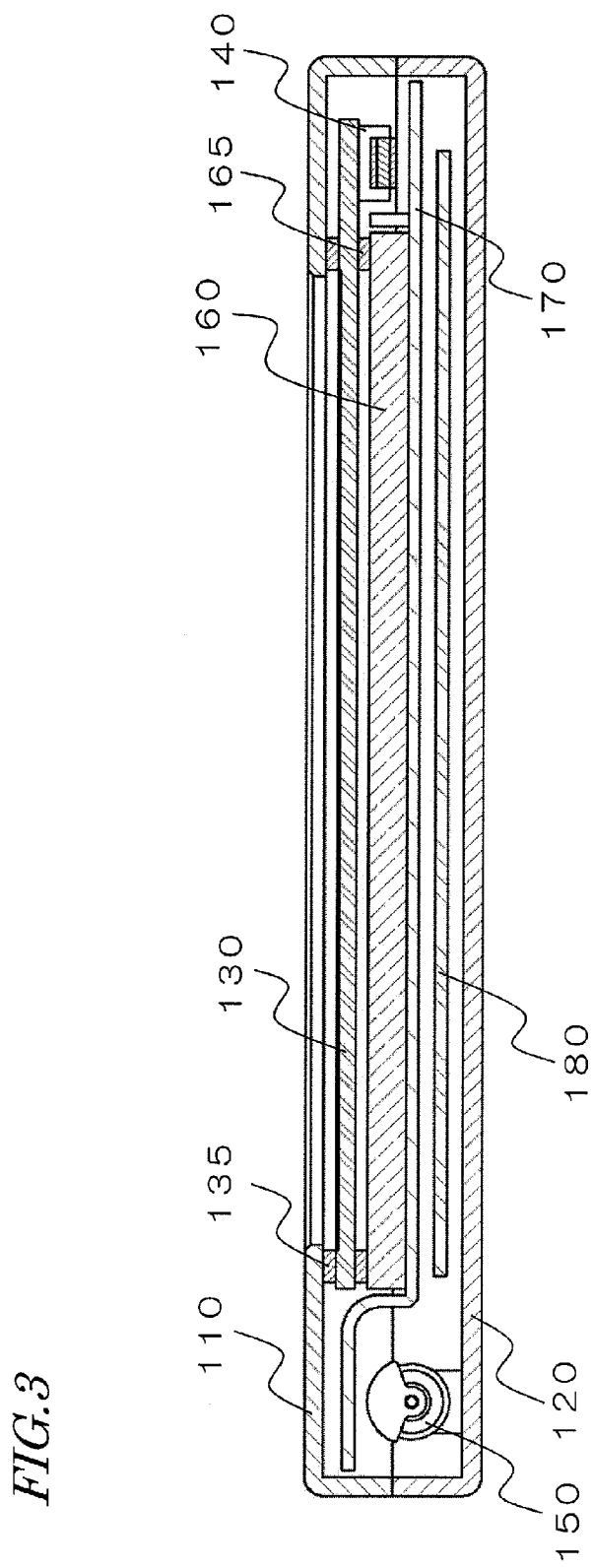
FIG. 3 is a cross-sectional view of an electronic device according to Embodiment 1.
Figure 4:
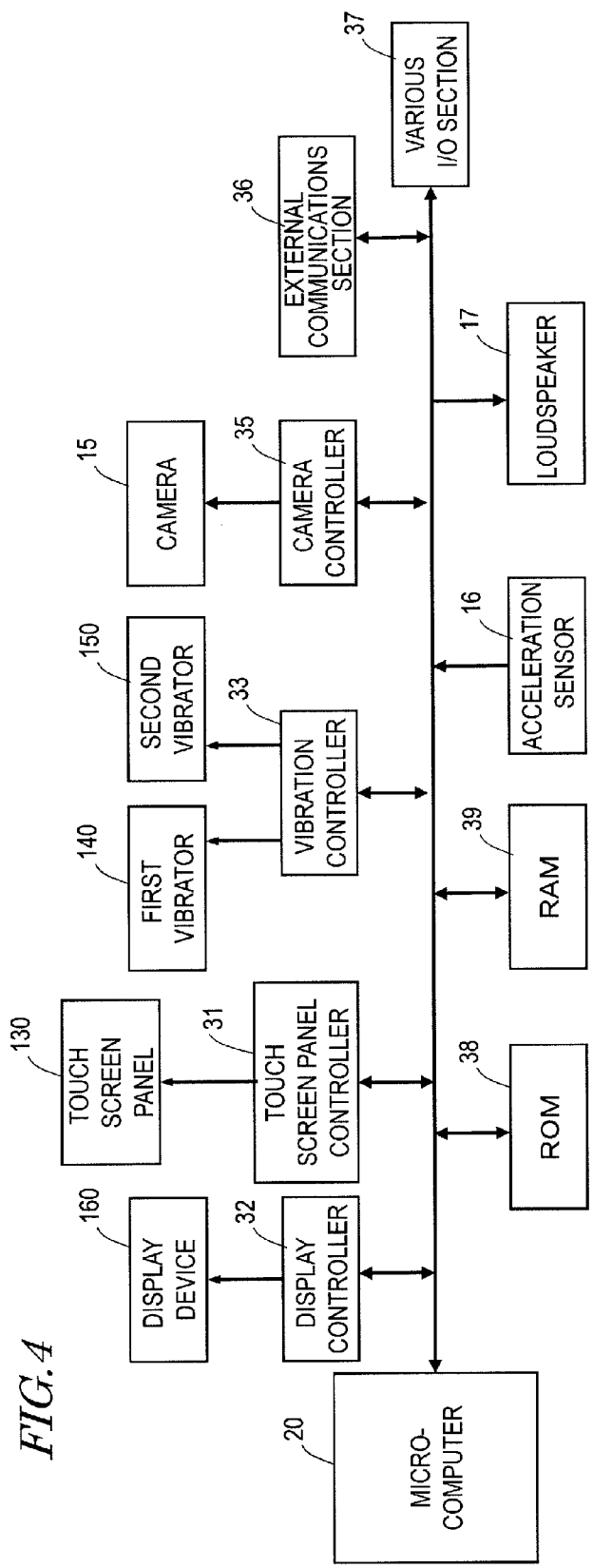
FIG. 4 is a block diagram of an electronic device according to Embodiment 1.

With reference to FIGS. 1 to 4, an overall construction of the electronic device will be described. FIG. 1 is a perspective view showing the overall construction of an electronic device 100 according to the present embodiment. FIG. 2 is an exploded perspective view of the electronic device 100 of the present embodiment. FIG. 3 is a cross-sectional view of the electronic device 100 of the present embodiment. FIG. 4 is a block diagram of the electronic device of the present embodiment.

First, FIG. 1 is referred to. As shown in FIG. 1, the electronic device 100 includes an upper housing 110, a lower housing 120, and a touch screen panel 130. The upper housing 110 and the lower housing 120 are integrally connected by using screws or the like, thus constituting a housing 105 of the electronic device 100.

A display device 160 (FIG. 2) is provided deeper from the touch screen panel 130.

With a finger, a pen, or the like, a user operates the electronic device 100 by touching, on the touch screen panel 130, what is displayed on the display device 160.

As shown in FIG. 2, the electronic device 100 includes the display device 160, the touch screen panel 130 covering the display device 160, a first vibrator 140 configured to vibrate the touch screen panel 130, and a second vibrator 150 configured to vibrate the lower housing 120. A display window 115 opens in the upper housing 110. The user is able to operate the touch screen panel 130 through the display window 115.

The first vibrator 140 is attached to the touch screen panel 130. By driving the first vibrator 140, the touch screen panel 130 is vibrated to present a tactile sensation to the user.

Moreover, in order to prevent this vibration of the touch screen panel 130 from being directly transmitted to the upper housing 110, a cushion 135 is provided between the upper housing 110 and the surface of the touch screen panel 130.

On a face of the touch screen panel 130 opposing the lower housing 120, the display device 160 is disposed. Similarly to the above, a cushion 165 is provided in order to prevent the vibration of the touch screen panel 130 from being directly transmitted to the display device 160. The cushions 135 and 165 are cushioning members such as silicone rubber or urethane rubber, for example.

Through the display window 115, an image which is displayed on the display device 160 can be visually perceived via the touch screen panel 130.

The display device 160 is attached to a frame 170 which is fixed to the lower housing 120, and thus is fixed to the interior of the electronic device 100.

The second vibrator 150 is attached to the lower housing 120. The lower housing 120 is vibrated by driving the second vibrator 150. As the lower housing 120 vibrates, a tactile sensation which is significantly different from that on the touch screen panel 130, to which the first vibrator 140 is attached, is presented to the user.

A circuit board 180 is attached to the lower housing 120, the circuit board 180 being electrically connected to the touch screen panel 130, the display device 160, and the first and second vibrators 140 and 150. The touch screen panel 130, the display device 160, and the first and second vibrators 140 and 150 are controlled by a microcomputer 20 (FIG. 4) which is provided on the circuit board 180.

The touch screen panel 130 may be a touch screen panel of an electrostatic type, a resistive membrane type, an optical type, an ultrasonic type, an electromagnetic induction type, or the like. The touch screen panel 130 is able to sense a position touched by the user. The touch screen panel 130 is controlled by the touch screen panel controller 31. Via the touch screen panel controller 31, the microcomputer 20 can acquire information on the touched position of the user.

The display device 160 is a display device, e.g., liquid crystal, organic EL, electronic paper, or plasma. The display device 160 is controlled by the display controller 32. Via the display controller 32, the microcomputer 20 is able to present an arbitrary indication to the user on the display device 160.

FIG. 3 shows a cross-sectional view of the electronic device 100 when the component elements disposed as shown in FIG. 2 are built into the housing 105.

Next, FIG. 4 is referred to.

As shown in FIG. 4, the electronic device 100 of the present embodiment includes a camera 15, an acceleration sensor 16, a loudspeaker 17, a microcomputer 20, a touch screen panel controller 31, a display controller 32, a vibration controller 33, a camera controller 35, a communications section 36, an I/O section 37, an ROM 38, a RAM 39, a touch screen panel 130, the first vibrator 140, the second vibrator 150, and the display device 160.

The camera 15 shoots an image under control of the camera controller 35. The acceleration sensor 16 measures an acceleration of or an impact on the electronic device 100. The loudspeaker 17 generates an audio. The communications section 36 communicates with an external device in a wired or wireless manner.

The I/O section 37 handles input/output of various signals. The ROM 38 stores various programs. The RAM 39 stores various data. The display controller 32 prepares data for an image to be drawn, and controls the display device 160 to display it.

The touch screen panel controller 31 controls the operation of the touch screen panel 130. Given that the touch screen panel 130 is an electrostatic type, the touch screen panel controller 31 detects a change in electrostatic capacitance of the touch screen panel 130, and outputs information of a position at which the change has occurred to the microcomputer 20.

Based on this position information, the microcomputer 20 is able to detect a position touched by the user, a change in the touched position, and a duration for which the touched state lasts. The vibration controller 33 receives such data from the microcomputer 20, and by using the information on the change in the position touched by the user and the duration of touch, the vibration controller 33 controls the vibration of the first vibrator 140 and the second vibrator 150, in response to various input operations by the user which will be described later.

<Construction of Vibrator>

Figure 5:
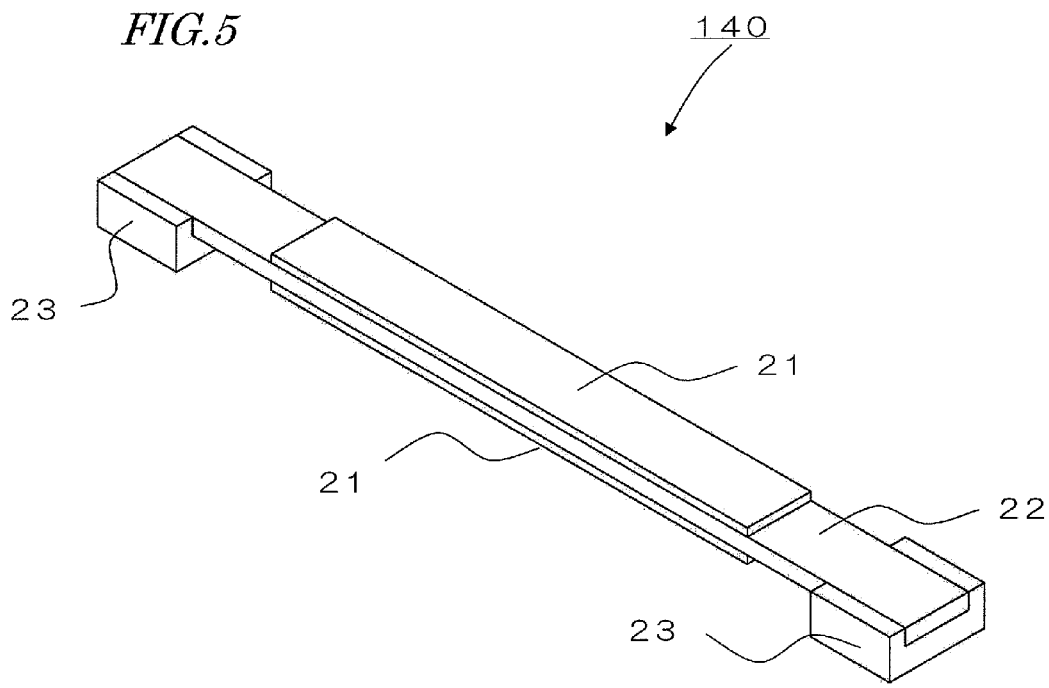
FIG. 5 is a perspective view of a first vibrator according to Embodiment 1.
Figure 6:
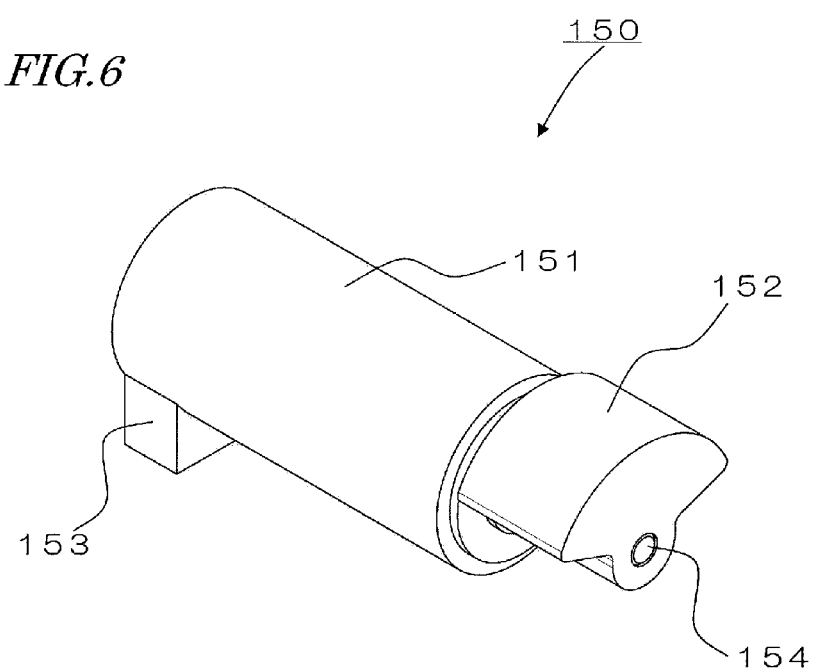
FIG. 6 is a perspective view of a second vibrator according to Embodiment 1.

Next, with reference to FIG. 5 and FIG. 6, the construction of the first and second vibrators 140 and 150 will be described. FIG. 5 is a perspective view of the first vibrator 140 according to the present embodiment. FIG. 6 is a perspective view of the second vibrator 150 according to the present embodiment.

As shown in FIG. 5, the first vibrator 140 includes piezoelectric elements 21, a shim 22, and bases 23. On both sides of the shim 22, the piezoelectric elements 21 are adhesively bonded. The piezoelectric elements 21 are pieces of a piezoelectric ceramic such as lead zirconate titanate or a piezoelectric single crystal such as lithium niobate, for example. Both ends of the shim 22 are attached to the bases 23, thus realizing a so-called simple beam construction. The bases 23 are attached to the touch screen panel 130. With a voltage from the vibration controller 33, the piezoelectric elements 21 expand or contract. By controlling them so that one of the piezoelectric elements 21, attached on both sides of the shim 22, expands while the other shrinks, the shim 22 flexes. A vibration is generated through continuous repetitions of this.

The shim 22 is a spring member of e.g. phosphor bronze. By way of the bases 23, the vibration of the shim 22 causes the touch screen panel 130 to also vibrate. Through a touch operation of the touch screen panel 130, the user operating the touch screen panel 130 is able to detect the vibration of the touch screen panel 130.

The bases 23 are made of a metal such as aluminum or brass, or a plastic such as PET or PP, for example.

The frequency, amplitude, and period of the vibration are controlled by the vibration controller 33. As the frequency of vibration, a frequency of about 100 to 400 Hz is desirable.

Although the present embodiment illustrates that the piezoelectric elements 21 are attached on the shim 22, the piezoelectric elements 21 may be attached directly onto the touch screen panel 11. In the case where a cover member or the like exists on the touch screen panel 11, the piezoelectric elements 21 may be attached on that cover member.

Although the present embodiment illustrates a simple beam construction where the shim 22 is supported by the bases 23 at both ends, a cantilever construction where the shim 22 supported only at one side by a base 23 may alternatively be adopted.

Moreover, one of the piezoelectric elements 21 may be directly disposed on the touch screen panel 130. Although the shim 22 is illustrated as an exemplary construction for vibrating the touch screen panel 130, a thin-film piezoelectric member may be formed on the touch screen panel 130 by methods such as sputtering, and used as a vibrator.

As shown in FIG. 6, the second vibrator 150 includes a DC motor 151, an eccentric weight 152, and a support portion 153. The DC motor 151 is attached to the support portion 153, and the support portion 153 is attached to the lower housing 120.

The eccentric weight 152 is attached to a tip end of a rotation axis 154 of the DC motor 151. When the vibration controller 33 applies a driving voltage to the DC motor 151, the eccentric weight 152 attached to the rotation axis 154 is rotated. This rotational motion of the eccentric weight 152 causes vibration.

The vibration of the DC motor 151 in turn vibrates the lower housing 120 via the support portion 153. The user who is operating the electronic device 100 is able to detect the vibration of the housing 105 of the electronic device 100 while the user is holding the electronic device 100 in one hand, for example.

The support portion 153 is a plastic, e.g., PET or PP, or a cushioning member, e.g., silicone rubber or urethane rubber, for example.

<Touch Operation Pattern>

Figure 8:
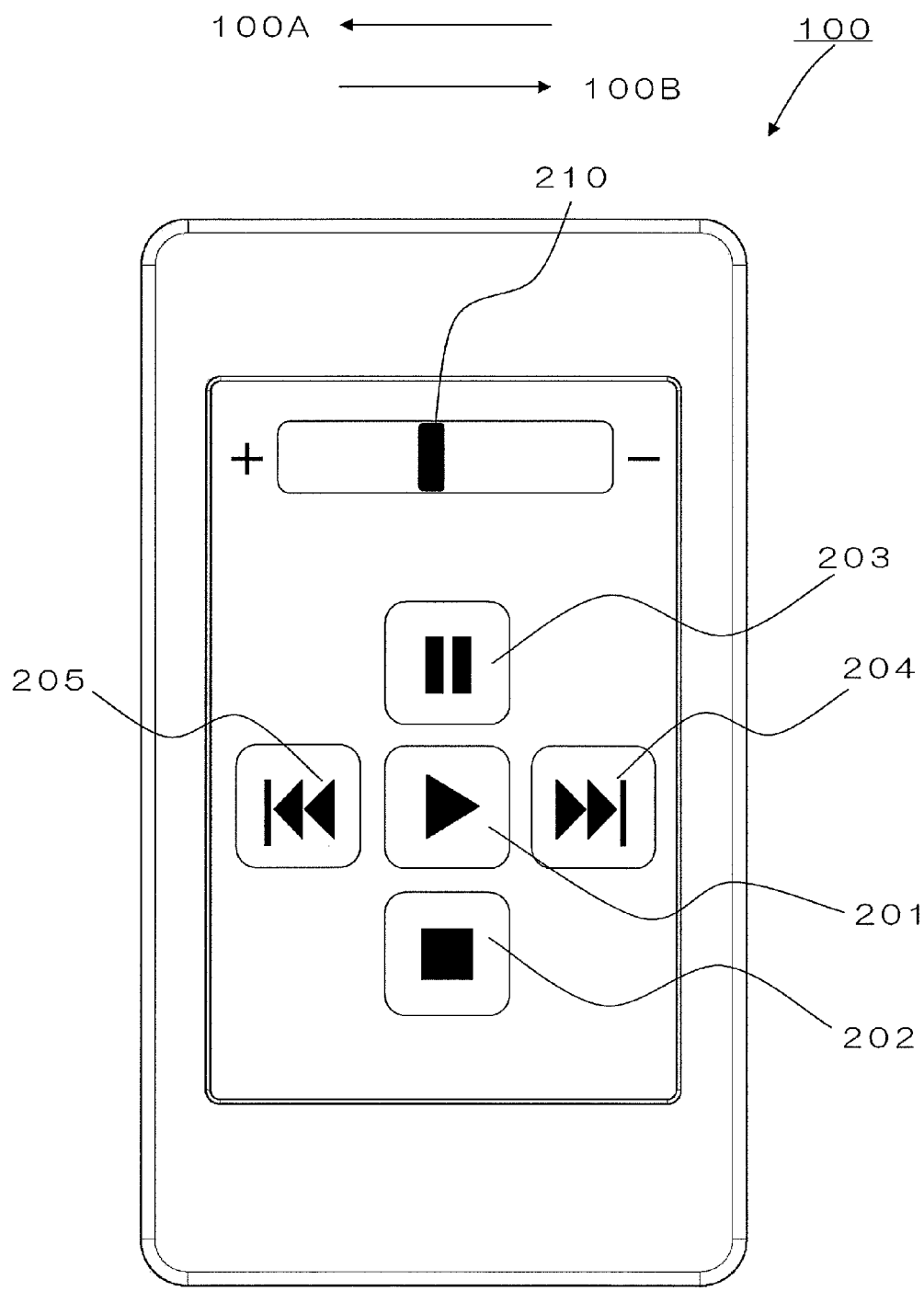
FIG. 8 is a diagram showing an example of a displayed operation screen of an electronic device according to Embodiment 1.
Figure 9:
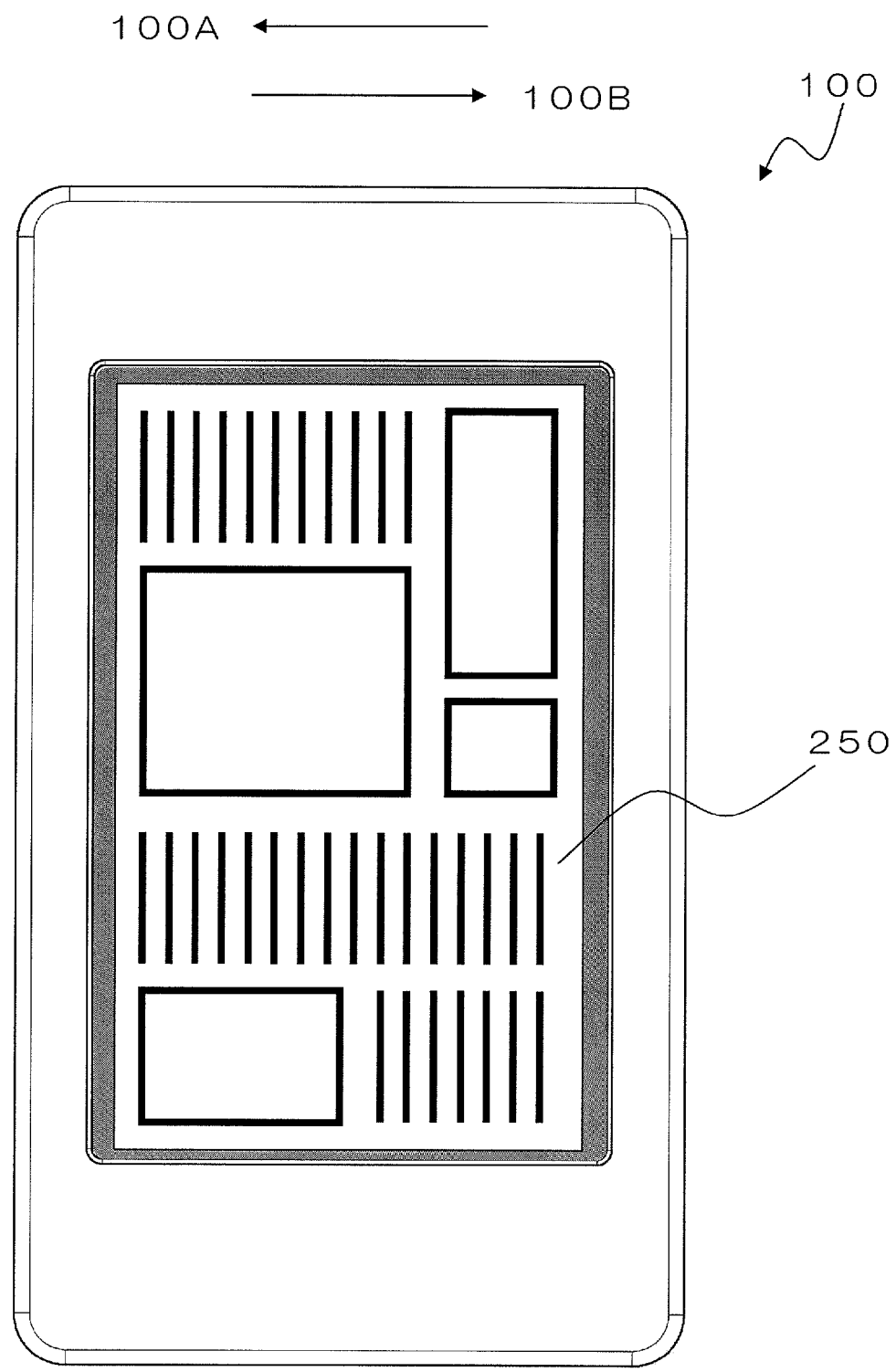
FIG. 9 is a diagram showing an example of a displayed operation screen of an electronic device according to Embodiment 1.

Touch operation patterns to occur when the user operates the electronic device 100 will be described with reference to FIG. 7 to FIG. 9. FIG. 7 is a diagram summarizing a relationship between touch operation patterns to the touch screen panel 130, changes in touched position on the touch screen panel 130, and touch duration. FIG. 8 is a diagram showing an example of a displayed operation screen of the electronic device 100, where an example of displaying operation keys of audio equipment or the like is illustrated. FIG. 9 shows an exemplary displayed operation screen of the electronic device 100, where an example of displaying an electronic newspaper, an e-book, or the like is illustrated.

As shown in FIG. 7, four touch operations can be differentiated based on the parameters of presence or absence of movement of the touched position on the touch screen panel 130, and the touch duration being shorter or longer than a given predetermined threshold value.

The notions of such operations will be specifically described with reference to FIG. 8 and FIG. 9. Although it will be illustrated herein that a user makes an operation with a finger, the input may be made with any input means other than a finger, e.g., a pen.

First, a click operation will be described. A click operation is an operation where a touch input is made to the touch screen panel 130 with a finger, the finger being immediately lifted off the touch screen panel 130. For example, this may be a case where playback, stop, or forward or backward skip operation of music is performed by using a PLAY key 201, a STOP key 202, a PAUSE key 203, a FORWARD SKIP key 204, or a BACKWARD SKIP key 205 shown in FIG. 8. For example, in the case of playing back music, an input for starting playback is made by touching the PLAY key 201 with a finger and immediately releasing it, whereby music is played back. Similarly, music can be stopped by operating the STOP key 202. Generally speaking, an operation of pressing and then releasing a button is referred to as a click operation in the present embodiment.

Next, a long tap operation will be described. A long tap operation is an operation where, after a touch input is made to the touch screen panel 130 with a finger, the touch screen panel 130 keeps being touched for a while without moving the finger, and thereafter the finger is lifted off the touch screen panel 130. For example, this may be a case where music is fast-forwarded or rewound by using an operation key shown in FIG. 8, i.e., the FORWARD SKIP key 204 or the BACKWARD SKIP key 205. For example, when fast-forwarding music, the FORWARD SKIP key 204 is touched with finger, and kept pressed for a while. Through such an operation, the piece of music which is being played back is fast-forwarded, rather than being skipped. The user may lift the finger off when he or she wishes to stop fast-forwarding, whereby fast-forwarding is ended. After fast-forwarding is ended, usual playback is resumed. Such an operation of continuing a touched state for a while and then releasing the touch is referred to as a long tap operation in the present embodiment.

Next, a slide operation will be described. A slide operation is an operation where, after a touch input is made to the touch screen panel 130 with a finger, the finger is slid, e.g. to the right or left, on the touch screen panel 130 while keeping on the touch screen panel 130, until the finger is lifted off the touch screen panel 130 as soon as the operation is finished. For example, this may be a case where the sound volume of the music is changed by using a sound volume key 210 shown in FIG. 8. For example, in the case of increasing the sound volume of the music, while the finger is kept touching the sound volume key 210, the finger is moved in the direction of arrow 100A. When a desired sound volume is attained, the finger is lifted off the touch screen panel 130, whereby sound volume adjustment is finished. Such an operation of sliding a finger on the touch screen panel 130 in a touching state and thereafter lifting it off is referred to as a slide operation in the present embodiment.

Next, a flick operation will be described. A flick operation is an operation where, after a touch input is made to the touch screen panel 130 with a finger, the finger is lifted off the touch screen panel 130 in a quick slide across the touch screen panel 130 e.g. to the right or left. In other words, it is an operation of touching the touch screen panel 130 with a finger and then moving the finger in a manner of "flicking". Stated otherwise, a flick operation might be considered as a quickened version of the aforementioned slide operation. For example, a flick operation may be made, as shown in FIG. 9, when flipping the pages of an electronic newspaper 250 which is displayed on the display device 160. For example, in order to allow a next page to be displayed in the electronic newspaper 250 (e.g., a page on the left-hand side of the electronic newspaper 250), an arbitrary position on the electronic newspaper 250 may be touched with a finger, and then the finger may be quickly "flicked" in the direction of arrow 100B, whereby the page of the electronic newspaper 250 switches to the next page. Such an operation of making a touch and thereafter lifting the finger off the touch screen panel 130 in a "flicking" motion of the finger on the touch screen panel 130 is referred to as a flick operation in the present embodiment.

<Flowchart of Touch Operation>

Figure 10:
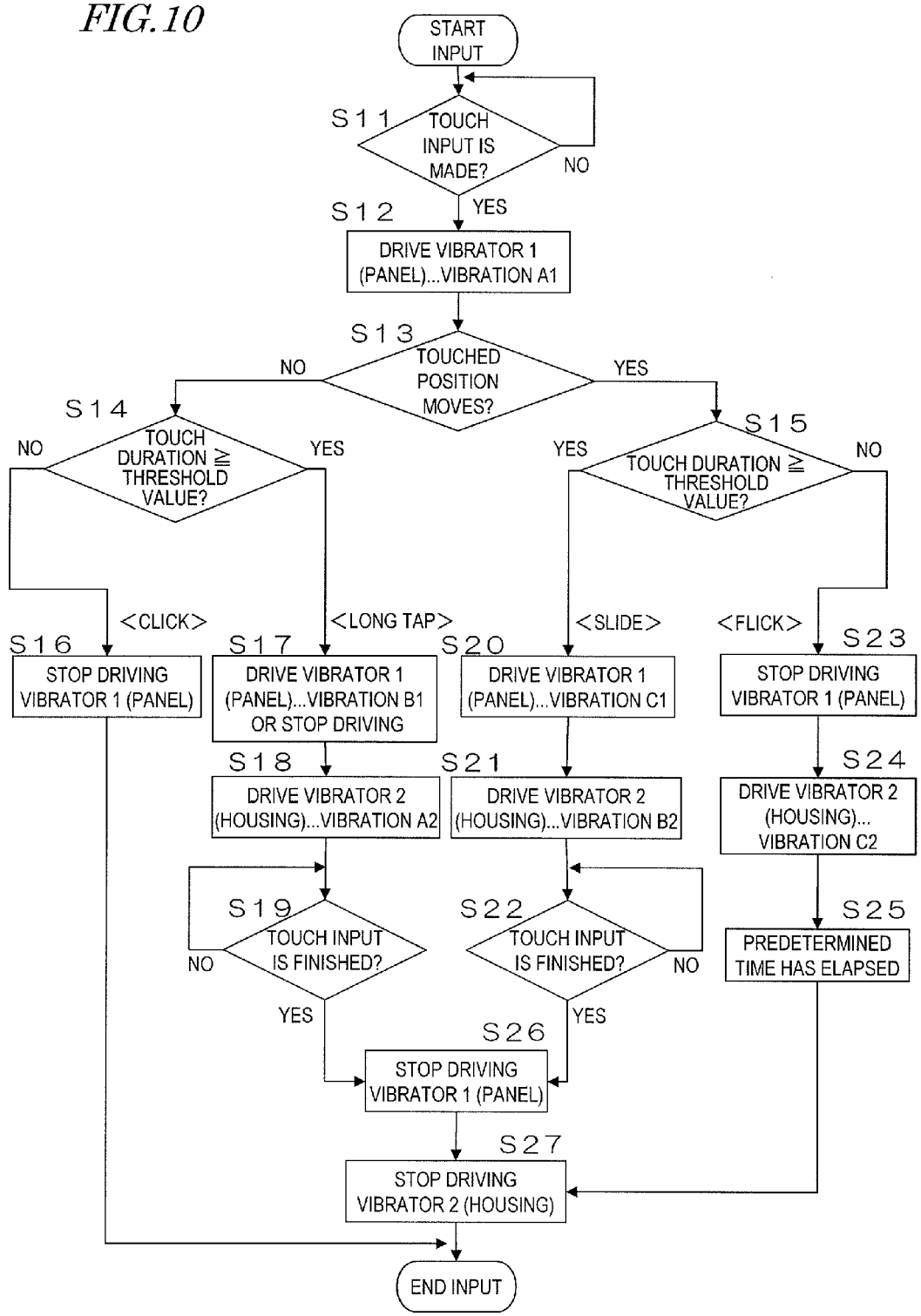
FIG. 10 is a flowchart showing a flow of information processing by an electronic device according to Embodiment 1.

FIG. 10 is a flowchart showing a flow of touch operation according to a first embodiment, where "S" stands for "step".

After the input operation is started, at S11, the microcomputer 20 determines whether the user has made a touch input to the touch screen panel 130, based on information from the touch screen panel controller 31. If a touch has not been made, control again waits until a touch occurs.

If S11 finds that a touch input has been made, the process proceeds to S12. At S12, the vibration controller 33 controls the first vibrator 140 to present vibration A1 to the user. By feeling vibration A1 through the touching finger, the user is able to know that the finger has touched the touch screen panel 130.

After vibration A1 is presented, the process proceeds to S13. At S13, based on information from the touch screen panel controller 31, the microcomputer 20 determines whether a finger movement has occurred on the touch screen panel 130. If the microcomputer 20 determines that no finger movement has occurred on the touch screen panel 130, the process proceeds to S14. At S14, based on information from the touch screen panel controller 31, the microcomputer 20 measures a duration for which the user has been touching the touch screen panel 130. Then, the microcomputer 20 determines whether the measured duration is equal to or greater than a predetermined threshold value. If the touch duration is less than the threshold value, it is distinguished as a click operation based on the classification shown in FIG. 7; if the touch duration is equal to or greater than the threshold value, it is distinguished as a long tap operation based on the classification shown in FIG. 7. The threshold value may be 1 (second), for example.

On the other hand, if at S13 the microcomputer 20 determines that there is a finger movement on the touch screen panel 130 based on information from the touch screen panel controller 31, the process proceeds to S15. At S15, based on information from the touch screen panel controller 31, the microcomputer 20 measures a duration for which the user has been touching the touch screen panel 130. Then, the microcomputer 20 determines whether the measured duration is equal to or greater than a predetermined threshold value. If the touch duration is equal to or greater than the threshold value, it is distinguished as a slide operation based on the classification shown in FIG. 7; if the touch duration is less than the threshold value, it is distinguished as a flick operation based on the classification shown in FIG. 7. The threshold value may be 0.2 (seconds), for example.

At S14, if the user's operation is distinguished as a click operation, the process proceeds to S16. At S16, the vibration controller 33 controls the first vibrator 140 to stop vibration A1. Thus, the input operation is finished.

If the user's operation is distinguished as a long tap operation at S14, the process proceeds to S17. At S17, the vibration controller 33 controls the first vibrator 140 to present vibration B1 to the user. Vibration B1 may be the same vibration pattern as vibration A1, or a different vibration pattern therefrom. Note that S17 may be controlled so as to stop vibration A1, rather than presenting vibration B1. Then, the process further proceeds to S18. At S18, the vibration controller 33 controls the second vibrator 150 to present vibration A2 to the user. By feeling vibration A2 from the housing 105 of the electronic device 100, the user is able to know that an operation which is different from the aforementioned click operation has been made.

After vibration A2 is presented at S18, the process proceeds to S19. At S19, based on information from the touch screen panel controller 31, the microcomputer 20 determines whether the user's touch input on the touch screen panel 130 is finished. If the touch input is not finished, control waits until the touch input is finished.

If S19 finds that the touch input is finished, the process proceeds to S26. At S26, the vibration controller 33 controls the first vibrator 140 to stop vibration. The process further proceeds to S27, and the vibration controller 33 controls the second vibrator 150 to stop vibration. Thus, the input operation is finished.

At S15, if the user's operation is distinguished as a slide operation, the process proceeds to S20. At S20, the vibration controller 33 controls the first vibrator 140 to present vibration C1 to the user. Vibration C1 may be the same vibration pattern as vibration A1, or a different vibration pattern therefrom. The process further proceeds to S21. At S21, the vibration controller 33 controls the second vibrator 150 to present vibration B2 to the user. By feeling vibration B2 from the housing 105 of the electronic device 100, the user is able to know that an operation which is different from the aforementioned long tap operation has been made.

After vibration B2 is presented, the process proceeds to S22. At S22, based on information from the touch screen panel controller 31, the microcomputer 20 determines whether the user's touch input to the touch screen panel 130 is finished. If the touch input is not finished, control waits until the touch input is finished.

If S22 finds that touch input is finished, the process proceeds to S26. At S26, the vibration controller 33 controls the first vibrator 140 to stop vibration. The process further proceeds to S27, and the vibration controller 33 controls the second vibrator 150 to stop vibration. Thus, the input operation is finished.

At S15, if the user's operation is distinguished as a flick operation, the process proceeds to S23. At S23, the vibration controller 33 controls the first vibrator 140 to stop vibration. The process further proceeds to S24. At S24, the vibration controller 33 controls the second vibrator 150 to present vibration C2 to the user. By feeling vibration C2 from the housing 105 of the electronic device 100, the user is able to know that an operation which is different from the aforementioned long tap operation or slide operation has been made.

After vibration C2 is presented at S24, the process proceeds to S25. At S25, with regard to the duration for which vibration C2 has been presented, the microcomputer 20 determines whether a predetermined time has elapsed. If the predetermined time has elapsed, the process proceeds to S27. At S27, the vibration controller 33 controls the second vibrator 150 to stop vibration. Thus, the input operation is finished.

In the present embodiment, vibration is presented to the user based on a combination of the vibrations of two vibrators, i.e., the first and second vibrators 140 and 150. Therefore, so long as differences among the four touch operations described above can be expressed by combinations of vibration patterns of the two vibrators, vibrations B1 and C1 of the first vibrator 140 may be identical to vibration A1, and vibrations B2 and C2 of the second vibrator 150 may be identical to vibration A2.

<Vibration Pattern>

Figure 11A:
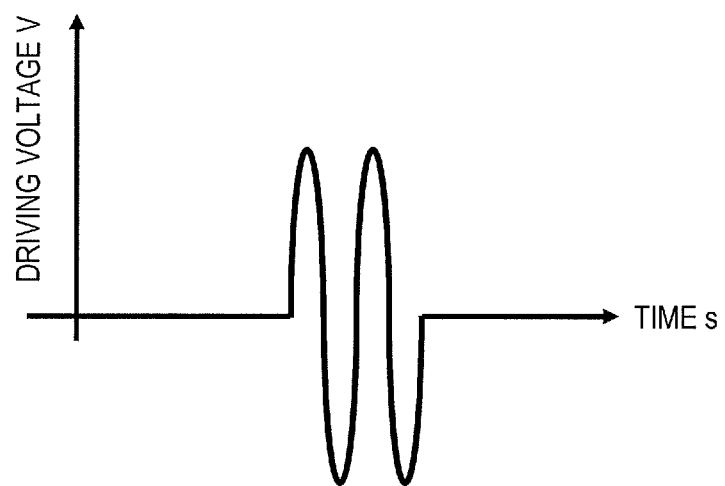
FIG. 11A is a schematic illustration showing an exemplary vibration pattern of a first vibrator according to Embodiment 1.
Figure 11B:
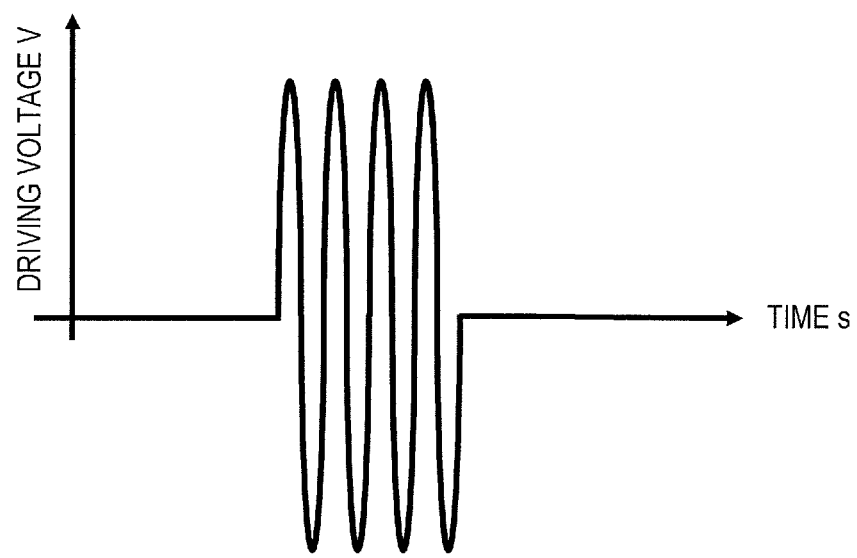
FIG. 11B is a schematic illustration of an exemplary vibration pattern of the first vibrator according to Embodiment 1.

FIGS. 11A and 11B are a schematic illustration of exemplary vibration patterns of the first vibrator 140.

Based on an instruction from the microcomputer 20, the vibration controller 33 applies a voltage as shown in FIG. 11A to the first vibrator 140 to vibrate the touch screen panel 130, thereby presenting vibration A1 to the user. The voltage for presenting vibration A1 may be a sine wave, e.g., 150 Hz, 70 Vrms, 2 cycles. In this case, there is about a 5 µm amplitude on the touch screen panel 130. Alternatively, the vibration controller 33 applies a voltage as shown in FIG. 11B to the first vibrator 140 to vibrate the touch screen panel 130, thereby presenting vibration B1 to the user. The voltage for presenting vibration B1 may be a sine wave, e.g., 300 Hz, 100 Vrms, 4 cycles. Note that the frequency, voltage, and number of cycles are examples; another waveform such as a rectangular wave or a sawtooth wave, an intermittent waveform, a waveform with a gradually changing frequency or amplitude, etc., may also be used.

FIGS. 12A to 12D are a schematic illustration of exemplary vibration patterns of the second vibrator 150.

Figure 12A:
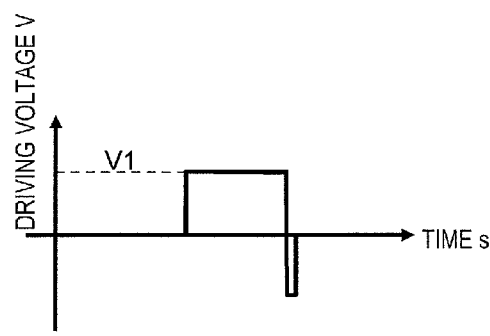
FIG. 12A is a schematic illustration of an exemplary vibration pattern of a second vibrator according to Embodiment 1.

Based on an instruction from the microcomputer 20, the vibration controller 33 applies a voltage V1 as shown in FIG. 12A to the second vibrator 150. As a result, the DC motor 151 rotates. When stopping the rotation, a voltage obtained by inverting the voltage V1 may be applied to brake the rotation. Vibration occurs as the eccentric weight 152 rotates around the rotation axis 154 in the manner shown in FIG. 6, whereby vibration A2 as shown in FIG. 12B is presented to the user.

Figure 12C:
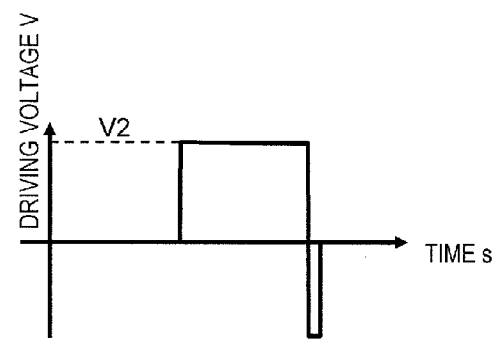
FIG. 12C is a schematic illustration of an exemplary vibration pattern of the second vibrator according to Embodiment 1.
Figure 12B:
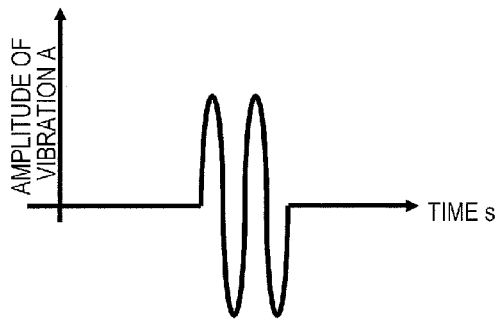
FIG. 12B is a schematic illustration of an exemplary vibration pattern of the second vibrator according to Embodiment 1.
Figure 12D:
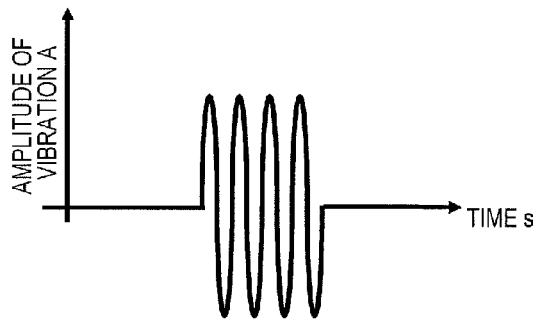
FIG. 12D is a schematic illustration of an exemplary vibration pattern of the second vibrator according to Embodiment 1.

Alternatively, the vibration controller 33 applies a voltage V2 as shown in FIG. 12C to the second vibrator 150, the voltage V2 being greater than the voltage V1. As a result, the DC motor 151 rotates. When stopping the rotation, a voltage obtained by inverting voltage V2 may be applied to brake the rotation. Vibration occurs as the eccentric weight 152 rotates around the rotation axis 154 in the manner shown in FIG. 6, whereby vibration B2 as shown in FIG. 12D is presented to the user. Since vibration B2 entails higher revolutions of the DC motor 151 than vibration A2, vibration B2 presents a vibration of a greater frequency than that of vibration A2 to the user.

Note that the waveforms applied to the DC motor 151 are examples; another waveform such as a sine wave or a sawtooth wave, an intermittent waveform, a waveform with a gradually changing frequency or amplitude, etc., may also be used.

<Example Vibration Presentations During Touch Operation>

Next, timings of vibration presentation in the four kinds of touch operations shown in FIG. 7 will be described.

The vibration timing during a click operation is described with reference to FIG. 13 and FIG. 14.

Figure 13:
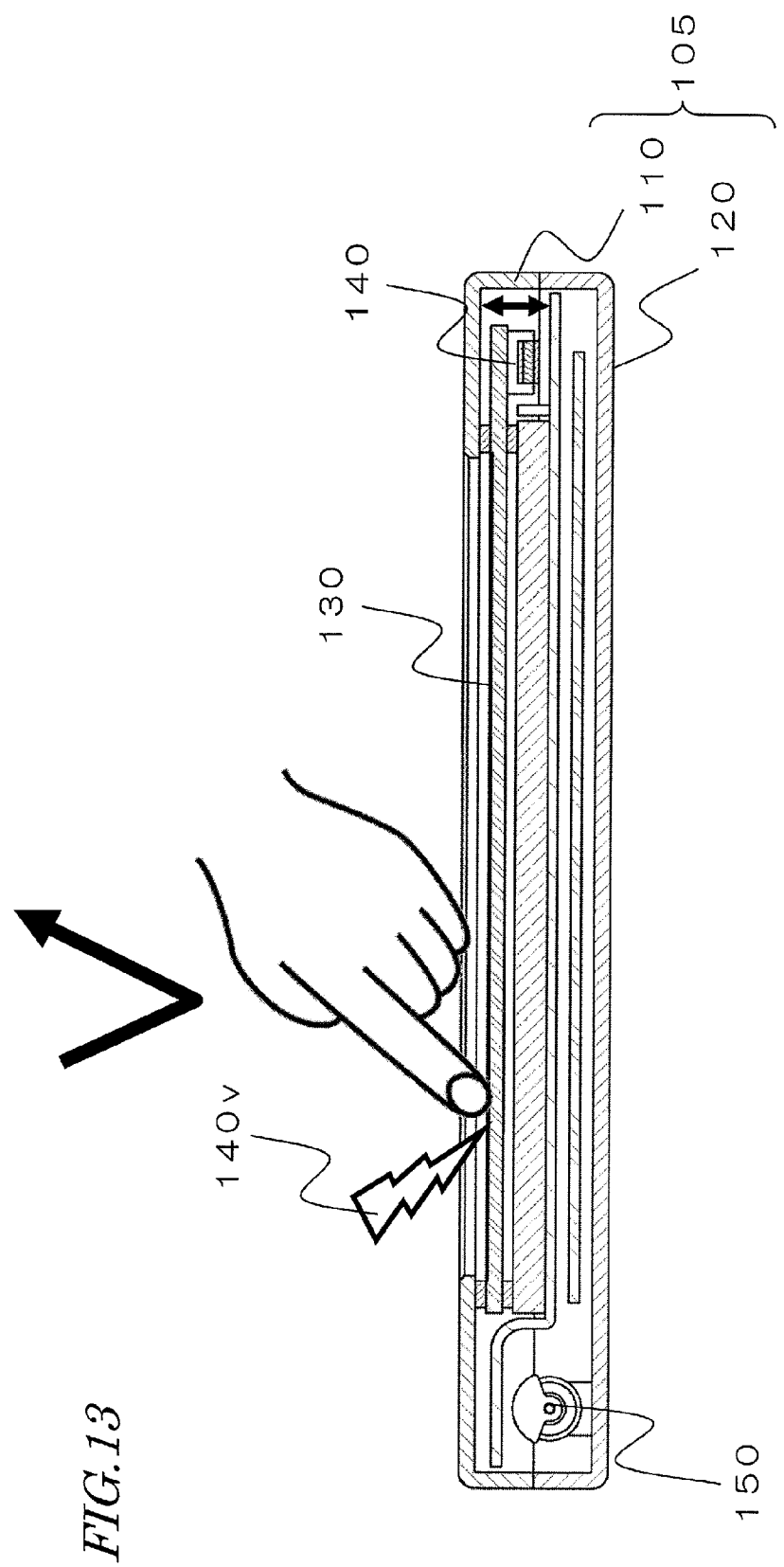
FIG. 13 is a schematic operational illustration of a click operation according to Embodiment 1.

FIG. 13 is a schematic operational illustration of a click operation; in the figure, mark 140v indicates that the touch screen panel 130 is vibrating.

Figure 14:
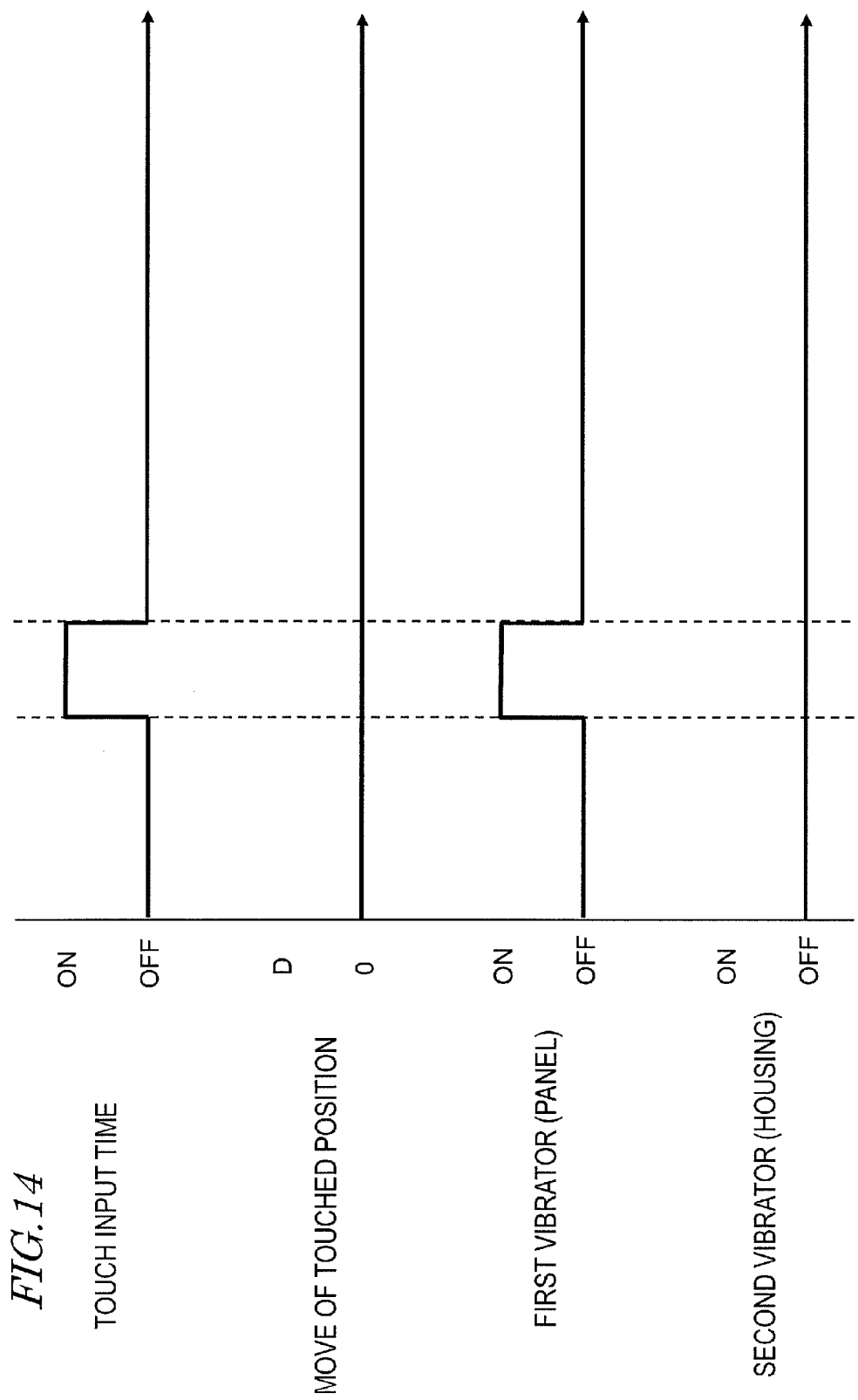
FIG. 14 is an operation timing diagram during a click operation according to Embodiment 1.

FIG. 14 is an operation timing diagram during a click operation, illustrating a relationship between touch input time, movement of the touched position, and timing of driving the first vibrator 140 and the second vibrator 150.

As shown in FIG. 13 and FIG. 14, the vibration during a click operation is accomplished by: when the touch screen panel 130 is touched with a finger, driving the first vibrator 140 to vibrate the touch screen panel 130; and when the finger is lifted off the touch screen panel 130, stopping driving the first vibrator 140.

The vibration timing during a long tap operation is described with reference to FIG. 15 and FIG. 16.

Figure 15:
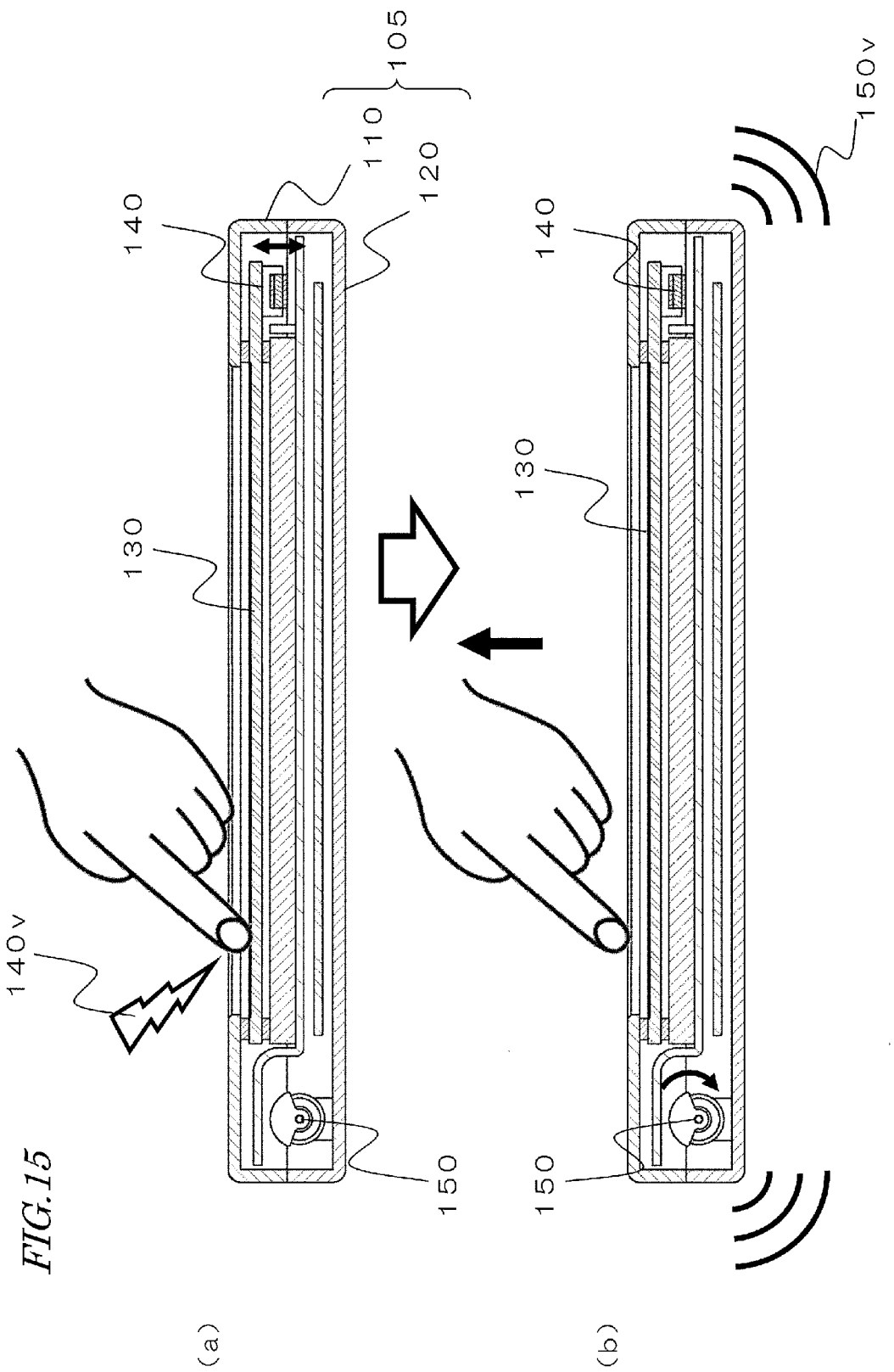
FIG. 15 is a schematic operational illustration of a long tap operation according to Embodiment 1.

FIG. 15 is a schematic operational illustration of a long tap operation; in the figure, mark 140v indicates that the touch screen panel 130 is vibrating, whereas mark 150v indicates that the housing 105 of the electronic device 100 is vibrating. FIG. 15 (a) is a schematic illustration of the operation at the moment of touch. FIG. 15(b) is a schematic illustration of the operation in the middle of an long tap.

Figure 16:
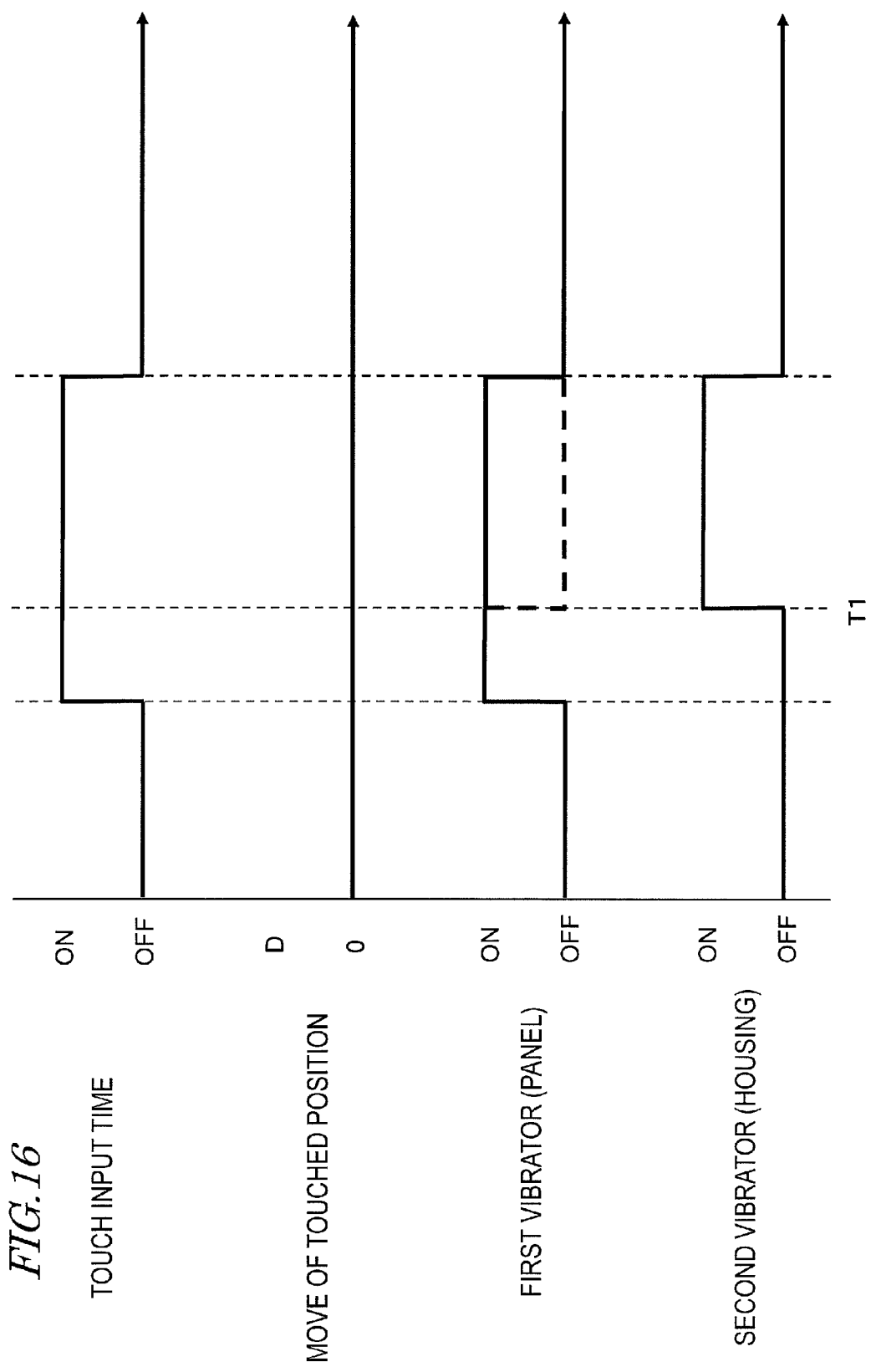
FIG. 16 is an operation timing diagram during a long tap operation according to Embodiment 1.

FIG. 16 is an operation timing diagram during a long tap operation, illustrating a relationship between touch duration, movement of the touched position, and timing of driving the first vibrator 140 and the second vibrator 150.

As shown in FIG. 15 and FIG. 16, the vibration during a long tap operation is accomplished by: when the touch screen panel 130 is touched with a finger, driving the first vibrator 140 to vibrate the touch screen panel 130; when the touched state lasts for a predetermined time T1 or longer, driving the second vibrator 150 to vibrate the housing 105 of the electronic device 100; and when the finger is lifted off the touch screen panel 130, stopping driving the first vibrator 140 and the second vibrator 150.

Although FIG. 16 illustrates that driving of the first vibrator 140 is continued until the finger is lifted off, driving may instead be stopped at time T1 as indicated by a broken line.

The vibration timing during a slide operation is described with reference to FIG. 17 and FIG. 18.

Figure 17:
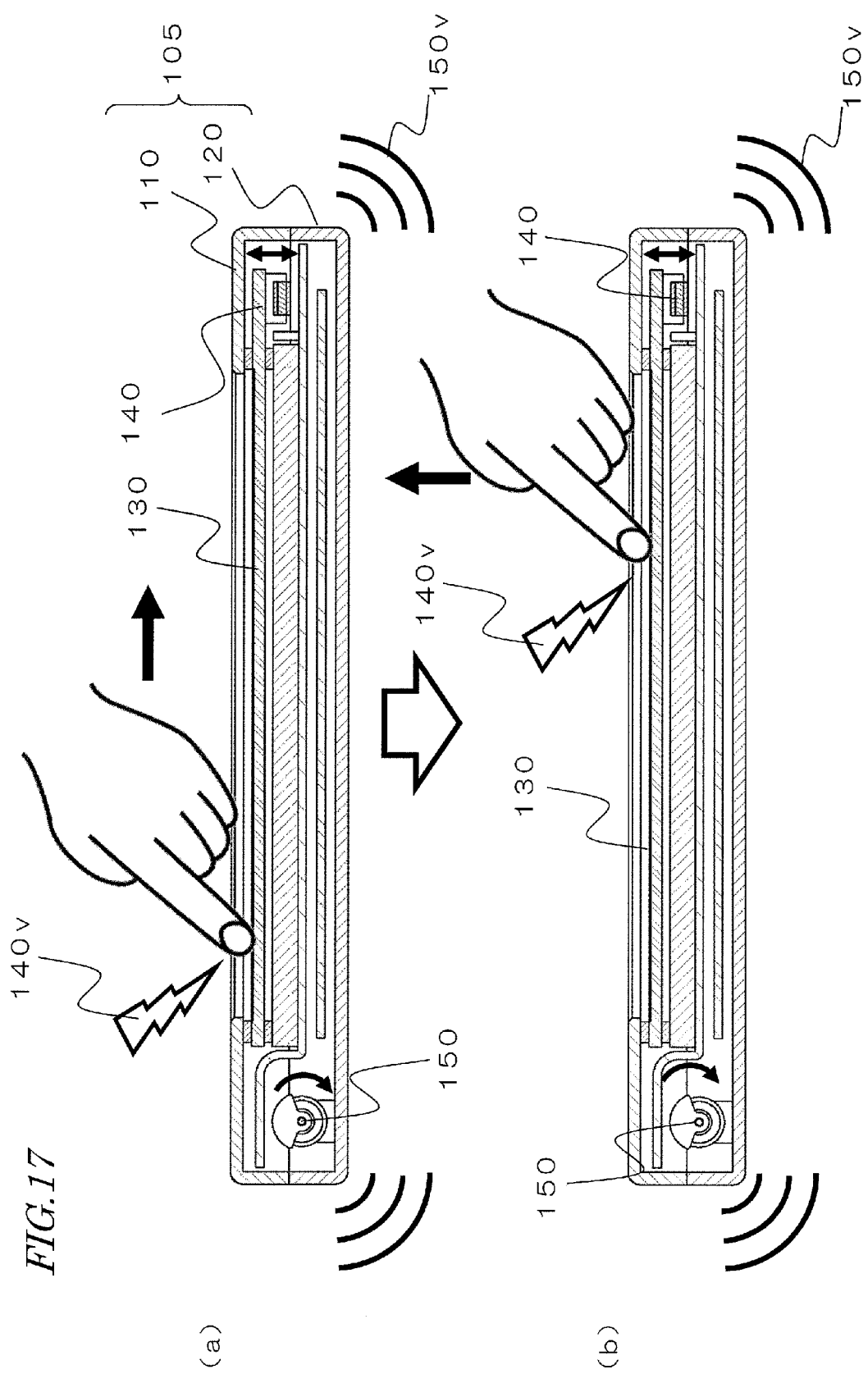
FIG. 17 is a schematic operational illustration of a slide operation according to Embodiment 1.

FIG. 17 is a schematic operational illustration of a slide operation; in the figure, mark 140v indicates that the touch screen panel 130 is vibrating, whereas mark 150v indicates that the housing of the electronic device 100 is vibrating. FIG. 17(a) is an illustration of the moment of touch, and FIG. 17(b) is an illustration immediately before the slide operation is finished.

Figure 18:
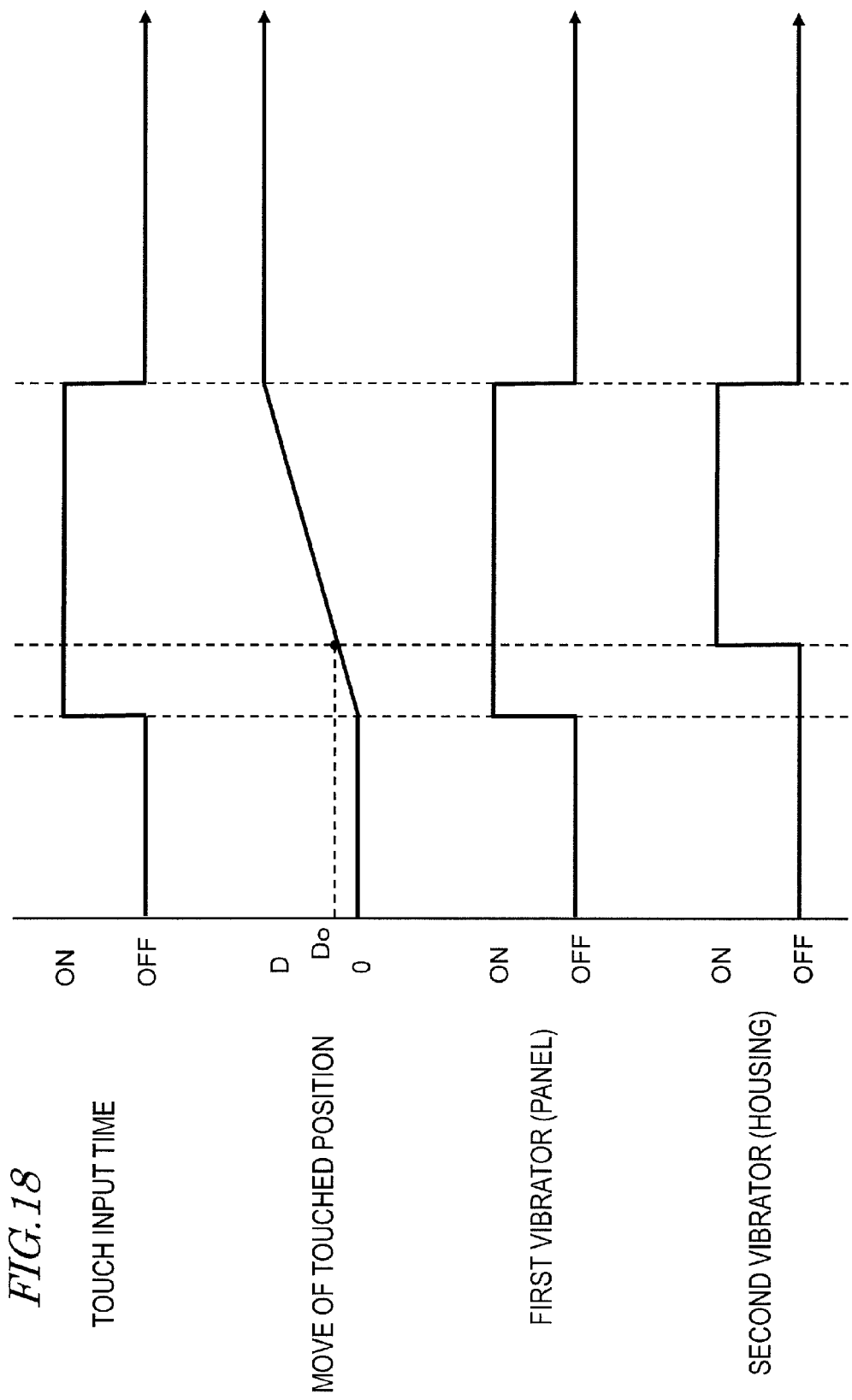
FIG. 18 is an operation timing diagram during a slide operation according to Embodiment 1.

FIG. 18 is an operation timing diagram during a slide operation, illustrating a relationship between touch duration, movement of the touched position, and timing of driving the first vibrator 140 and the second vibrator 150.

As shown in FIG. 17 and FIG. 18, the vibration during a slide operation is accomplished by: when the touch screen panel 130 is touched with a finger, driving the first vibrator 140 to vibrate the touch screen panel 130; if the finger movement on the touch screen panel 130 undergoes a predetermined displacement D0 or more, driving the second vibrator 150 to vibrate the housing 105 of the electronic device 100; and when the finger is lifted off the touch screen panel 130, stopping driving the first vibrator 140 and the second vibrator 150.

The vibration timing during a flick operation is described with reference to FIG. 19 and FIG. 20.

Figure 19:
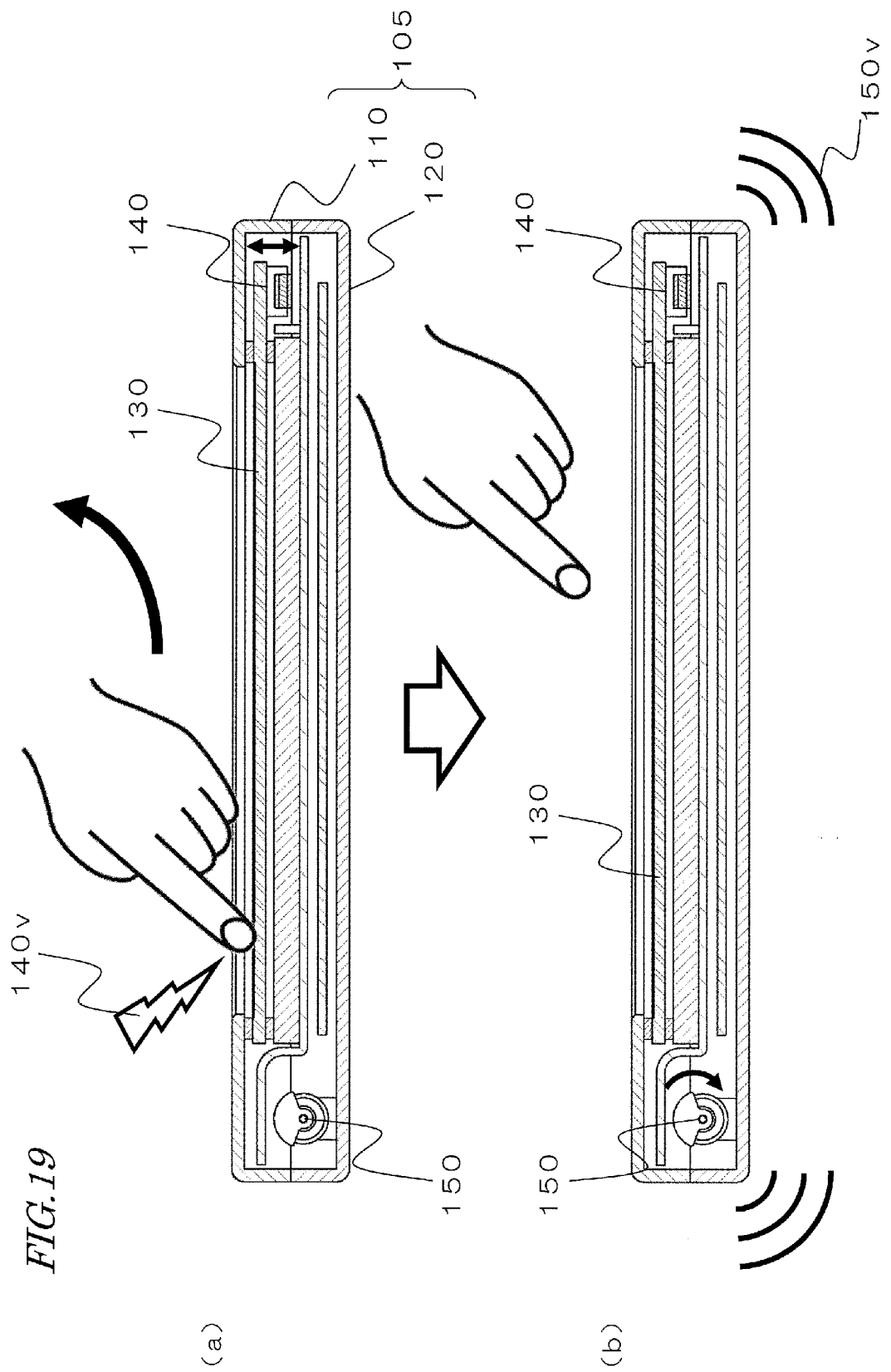
FIG. 19 is a schematic operational illustration of a flick operation according to Embodiment 1.

FIG. 19 is a schematic operational illustration of a flick operation; in the figure, mark 140v indicates that the touch screen panel 130 is vibrating, whereas mark 150v indicates that the housing of the electronic device 100 is vibrating. FIG. 19(a) is an illustration of the moment of touch, and FIG. 19(b) is an illustration immediately after the flick operation is finished.

Figure 20:
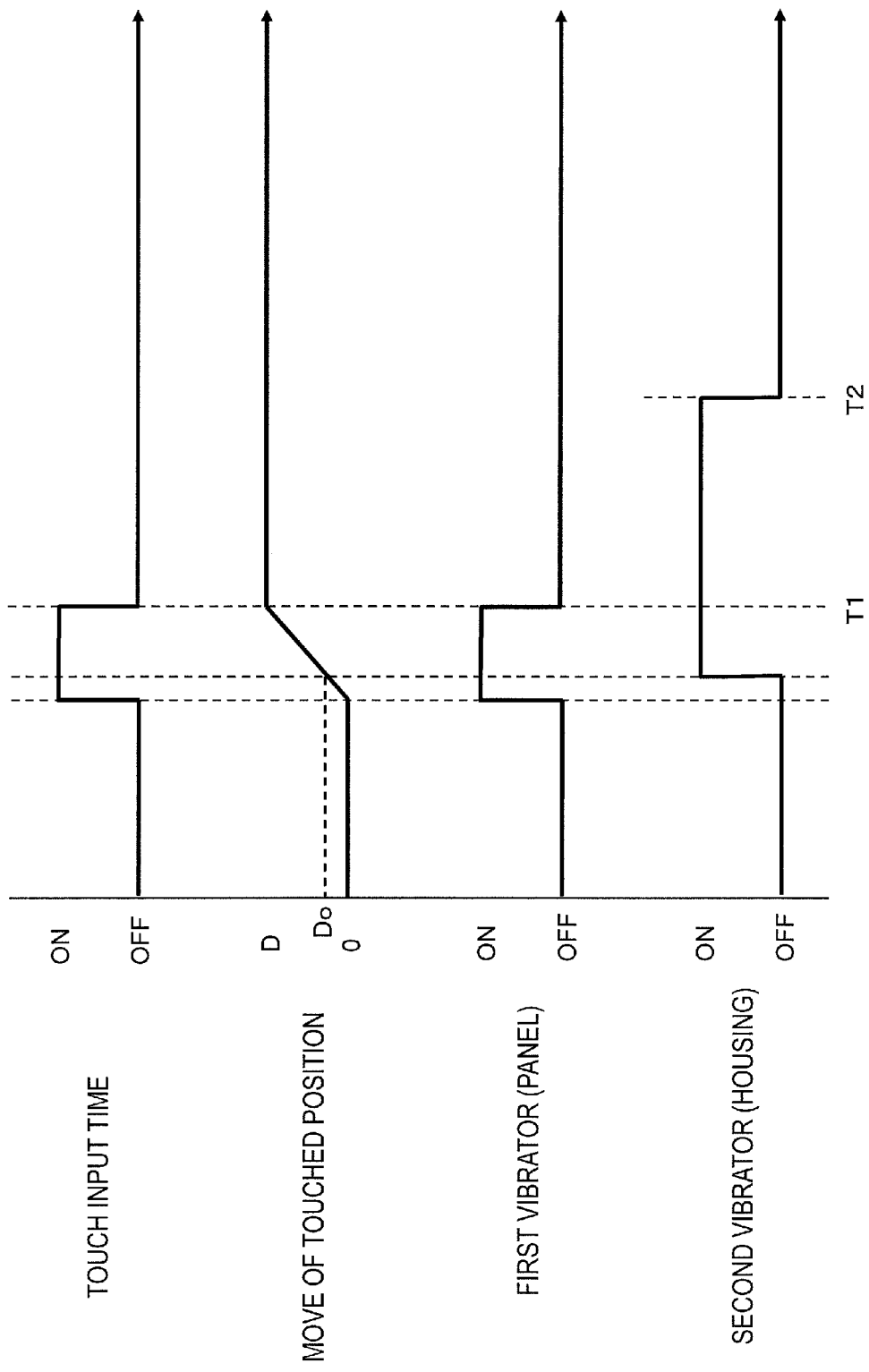
FIG. 20 is an operation timing diagram during a flick operation according to Embodiment 1.

FIG. 20 is an operation timing diagram during a flick operation, illustrating a relationship between touch duration, movement of the touched position, and timing of driving the first vibrator 140 and the second vibrator 150.

As shown in FIG. 19 and FIG. 20, the vibration during a flick operation is accomplished by: when the touch screen panel 130 is touched with a finger, driving the first vibrator 140 to vibrate the touch screen panel 130; if the finger movement on the touch screen panel 130 undergoes a predetermined displacement D0 or more, driving the second vibrator 150 to vibrate the housing of the electronic device 100; and when the finger is lifted off the touch screen panel 130, stopping the vibration of the first vibrator 140, but driving the second vibrator 150 for a predetermined time T2 before it is stopped.

Thus, by utilizing vibration of the housing 105, the electronic device 100 of the present embodiment is able to keep presenting vibration to the user even after the finger is lifted off. Therefore, a vibration different from that associated with a click operation can be presented to the user.

Thus, by relying on the touch duration and movement of the touched position of a touch operation to the touch screen panel 130 as parameters, an operation of the touch screen panel 130 can be distinguished. Furthermore, the first vibrator 140 and the second vibrator 150 are driven with an operation timing which is adapted to the result of distinction. Since the first vibrator 140 vibrates the touch screen panel 130, and the second vibrator 150 vibrates the housing 105, the electronic device 100 is able to present a vibration which is adapted to the touch operation to the user.

The combination of vibrations of the first and second vibrators 140 and 150 and the operation timing in each touch operation according to the present embodiment are examples. So long as differences among the four touch operations described above can be expressed, this combination should not be limitative.

Although the movement of the touched position is illustrated to be of uniform velocity in FIG. 18 and FIG. 20, the velocity of operation of the user may actually vary. Therefore, the vibration patterns of the first vibrator 140 and the second vibrator 150 may be controlled by using information of the moving velocity of the touched position.

(Embodiment 2)

Next, an electronic device according to a second embodiment will be described. The electronic device of the second embodiment differs from the first embodiment in that displayed-image information is used, such that no vibration is generated depending on the touched position. Hereinafter, the difference will be described.

<Flowchart of Touch Operation>

Figure 21:
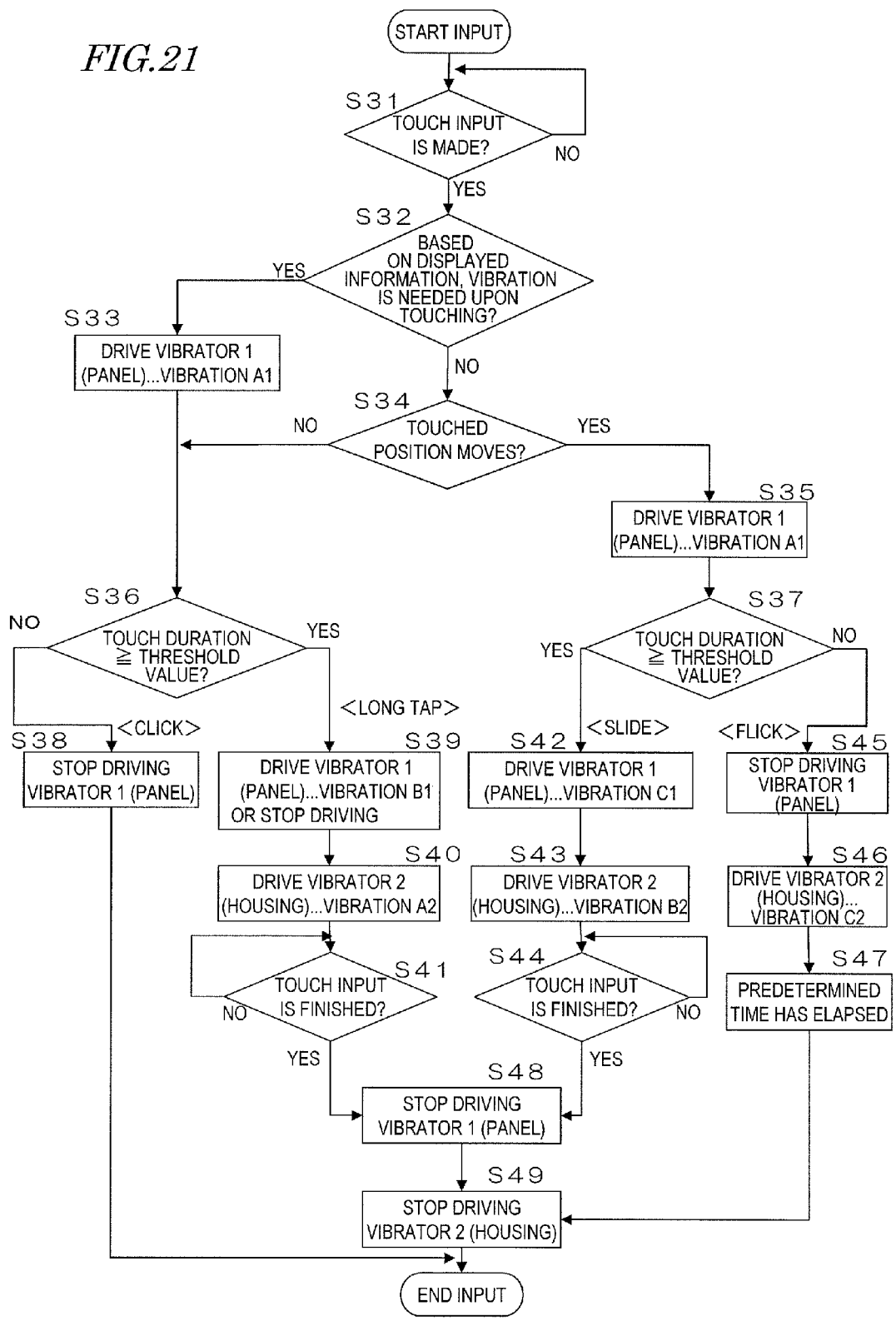
FIG. 21 is a flowchart showing a flow of touch operation according to Embodiment 2.

FIG. 21 is a flowchart showing a flow of touch operation according to the second embodiment, where "S" stands for "step".

After the input operation is started, the process proceeds to S31. At S31, based on information from the touch screen panel controller 31, the microcomputer 20 determines whether the user has made a touch input to the touch screen panel 130. If a touch has not been made, control again waits until a touch occurs.

If S31 finds that a touch input has been made, the process proceeds to S32. At S32, first, information concerning the display screen is sent from the display controller 32 to the microcomputer 20. Moreover, information concerning the touched position is sent from the touch screen panel controller 31 to the microcomputer 20. Based on the information concerning the display screen and information concerning the touched position which have been sent, the microcomputer 20 determines whether it is necessary to vibrate the touch screen panel 130 as soon as a touch input is made by the user.

At S32, if the microcomputer 20 determines that vibration upon touching is necessary, the process proceeds to S33. At S33, the vibration controller 33 controls the first vibrator 140 to present vibration A1 to the user. By feeling vibration A1 through the touching finger, the user is able to know that the finger has touched the touch screen panel 130. After vibration A1 is presented at S33, the process proceeds to S36.

On the other hand, if at S32 the microcomputer 20 determines that vibration upon touching is not necessary, the process proceeds to S34. At S34, based on information from the touch screen panel controller 31, the microcomputer 20 determines whether there is any finger movement on the touch screen panel 130. If the microcomputer 20 determines that no finger movement has occurred on the touch screen panel 130, the process proceeds to S36. At S36, the microcomputer 20 measures the duration of the touch on the touch screen panel 130, and determines whether the touch duration is equal to or greater than a predetermined threshold value. If the touch duration is less than the threshold value, the user's touch operation is distinguished as a click operation based on the classification shown in FIG. 7. If the touch duration is equal to or greater than the threshold value, the user's touch operation is distinguished as a long tap operation based on the classification shown in FIG. 7.

On the other hand, if at S34 the microcomputer 20 determines that there is a finger movement on the touch screen panel 130, the process proceeds to S35. At S35, the vibration controller 33 controls the first vibrator 140 to present vibration A1 to the user. By feeling vibration A1 through the touching finger, the user is able to know that the finger has touched the touch screen panel 130. After vibration A1 is presented at S35, the process proceeds to S37. At S37, the microcomputer 20 measures the duration of the user's touch on the touch screen panel 130. Then, the microcomputer 20 determines whether the measured touch duration is equal to or greater than a predetermined threshold value. If the touch duration is equal to or greater than the threshold value, it is distinguished as a slide operation based on the classification shown in FIG. 7; if the touch duration is less than the threshold value, it is distinguished as a flick operation based on the classification shown in FIG. 7.

<Click Operation>

Next, the flow of processes when the user's operation is distinguished as a click operation is described.

At S36, if the user's operation is distinguished as a click operation, the process proceeds to S38. At S38, the vibration controller 33 controls the first vibrator 140 to stop vibration A1. Thus, the input operation is finished.

<Long Tap Operation>

Next, the flow of processes when the user's operation is distinguished as a long tap operation is described.

At S36, if the user's operation is distinguished as a long tap operation, the process proceeds to S39. At S39, the vibration controller 33 controls the first vibrator 140 to present vibration B1 to the user. Alternatively, the vibration controller 33 may stop vibration of the first vibrator 140. Thereafter, the process proceeds to S40. At S40, the vibration controller 33 controls the second vibrator 150 to present vibration A2 to the user. By feeling vibration A2 from the housing 105 of the electronic device 100, the user is able to know that an operation which is different from the aforementioned click operation has been made.

After vibration A2 is presented at S40, the process proceeds to S41. At S41, based on information from the touch screen panel controller 31, the microcomputer 20 determines whether the user's touch input to the touch screen panel 130 is finished. If the touch input is not finished, control waits until the touch input is finished.

If S41 finds that touch input is finished, the process proceeds to S48. At S48, the vibration controller 33 controls the first vibrator 140 to stop vibration. After vibration of the first vibrator 140 is stopped, the process proceeds to S49. At S49, the vibration controller 33 controls the second vibrator 150 to stop vibration. When vibration of the second vibrator 150 is stopped, the microcomputer 20 determines that the user's input operation is finished.

<Slide Operation>

Next, the flow of processes when the user's operation is distinguished as a slide operation is described.

At S37, if the user's operation is distinguished as a slide operation, the process proceeds to S42. At S42, the vibration controller 33 controls the first vibrator 140 to present vibration C1 to the user. After vibration C1 is presented to the user at S42, the process proceeds to S43. At S43, the vibration controller 33 controls the second vibrator 150 to present vibration B2 to the user. By feeling vibration B2 from the housing 105 of the electronic device 100, the user is able to know that an operation which is different from the aforementioned long tap operation has been made.

After vibration B2 is presented at S43, the process proceeds to S44. At S44, based on information from the touch screen panel controller 31, the microcomputer 20 determines whether the user's touch input to the touch screen panel 130 is finished. If the touch input is not finished, control waits until the touch input is finished.

If S44 finds that touch input is finished, the process proceeds to S48. At S48, the vibration controller 33 controls the first vibrator 140 to stop vibration. After vibration of the first vibrator 140 is stopped, the process proceeds to S49. At S49, the vibration controller 33 controls the second vibrator 150 to stop vibration. When vibration of the second vibrator 150 is stopped, the microcomputer 20 determines that the user's input operation is finished.

<Flick Operation>

Next, the flow of processes when the user's operation is distinguished as a flick operation is described.

At S37, if the user's operation is distinguished as a flick operation, the process proceeds to S45. At S45, the vibration controller 33 controls the first vibrator 140 to stop vibration. After vibration of the first vibrator 140 is stopped, the process proceeds to S46. At S46, the vibration controller 33 controls the second vibrator 150 to present vibration C2 to the user. By feeling vibration C2 from the housing 105 of the electronic device 100, the user is able to know that an operation which is different from the aforementioned long tap operation or slide operation has been made.

After vibration C2 is presented at S46, the process proceeds to S47. After the microcomputer 20 determines that a predetermined time has elapsed at S47, the process proceeds to S49. At S49, the vibration controller 33 controls the second vibrator 150 to stop vibration. When vibration of the second vibrator 150 is stopped, the microcomputer 20 determines that the user's input operation is finished.

In the present embodiment, vibration is presented to the user based on a combination of the vibrations of two vibrators, i.e., the first and second vibrators 140 and 150. Therefore, so long as differences among the four touch operations described above can be expressed by combinations of vibration patterns of the two vibrators, vibrations B1 and C1 of the first vibrator 140 may be identical to vibration A1, and vibrations B2 and C2 of the second vibrator 150 may be identical to vibration A2.

<Example Vibration Presentations During Touch Operation>

Next, with reference to FIG. 22, the operation timing according to the second embodiment will be described.

Although the flowchart of FIG. 21 encompasses the four touch operations shown in FIG. 7, the slide operation is taken for instance here.

The vibration timing during a slide operation according to the second embodiment is described with reference to FIG. 22. FIG. 22 is an operation timing diagram during a slide operation, illustrating a relationship between touch duration, movement of the touched position, and timing of driving the first vibrator 140 and the second vibrator 150.

Figure 22:
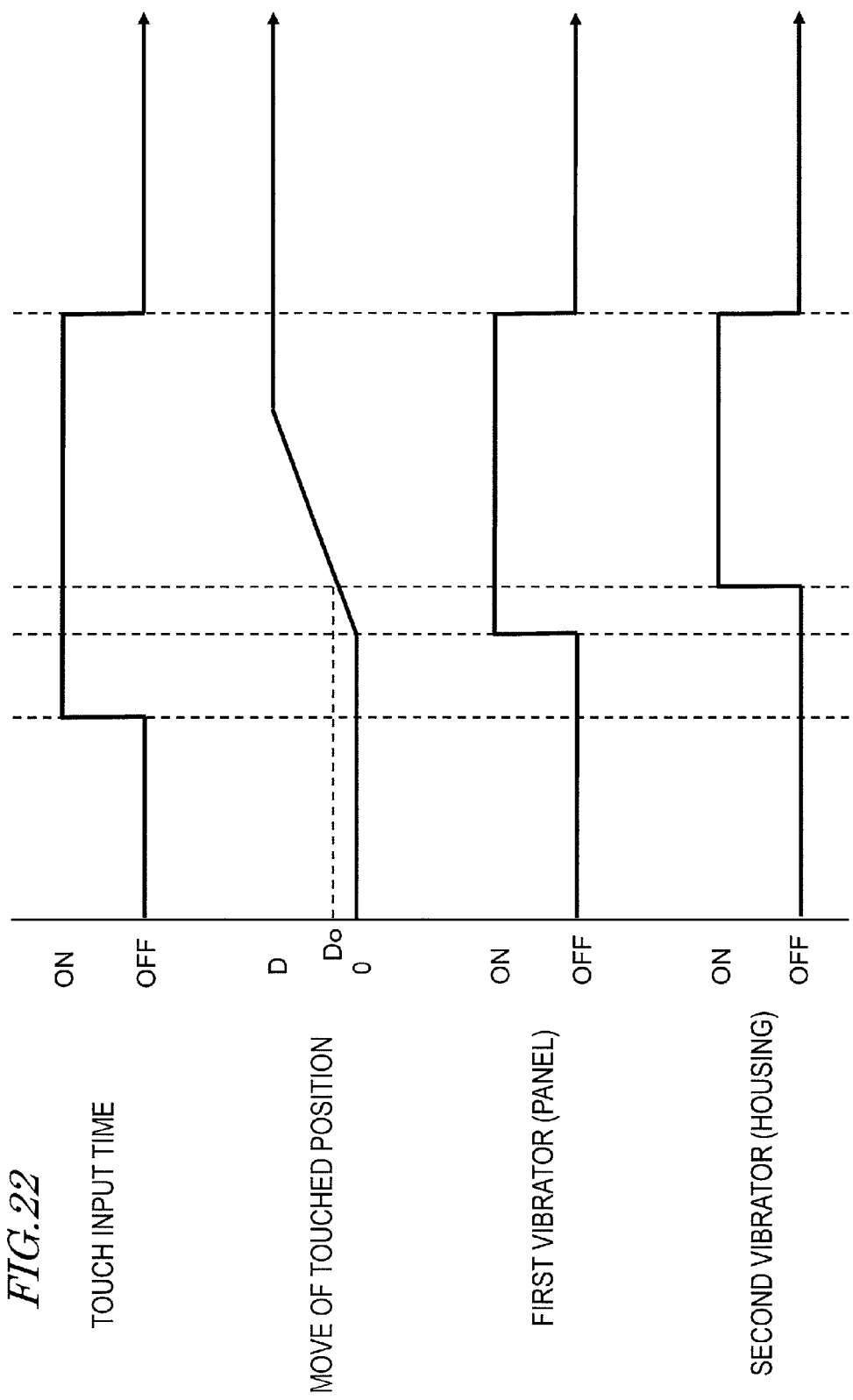
FIG. 22 is an operation timing diagram during a slide operation according to Embodiment 2.

As shown in FIG. 22, in the slide operation according to the second embodiment, the first vibrator 140 and the second vibrator 150 are not driven when the touch screen panel 130 is touched with a finger. When there is a finger movement on the touch screen panel 130, the first vibrator 140 is driven to vibrate the touch screen panel 130. If the finger movement on the touch screen panel 130 undergoes a predetermined displacement D0 or more, the second vibrator 150 is driven to vibrate the housing of the electronic device 100. Then, when the finger is lifted off the touch screen panel 130, driving of the first vibrator 140 and the second vibrator 150 is stopped.

Thus, based on the information of a displayed item for which the user's operation is performed, the touch screen panel 130 is not vibrated at the moment of a touch input, but vibration of the touch screen panel 130 is generated only while a slide operation is being made. This provides for an improved operation feel based on presentation of tactile sensations.

Although the above description of the present embodiment is directed to a slide operation, this is not a limitation; the same also applies to the other touch screen panel operations.

(Embodiment 3)

Next, an electronic device according to a third embodiment will be described. The electronic device of the third embodiment differs from the first and second embodiments in that, by using displayed-image information, an alert vibration is presented when a forbidden operation is attempted, thereby informing the user via the tactile sensation that a forbidden operation has been attempted.

Hereinafter, the difference will be described.

<Example Alert Operation>

An operation example in the case where the user has attempted a forbidden operation will be described with reference to FIG. 23.

In the present specification, a "forbidden operation" means any operation that is incapable of execution, e.g., an operation that the user is not allowed to perform, or an operation that the electronic device cannot accept. For example, to a user who lacks the due permission, any permission-requiring operation would constitute a "forbidden operation". Moreover, in connection with an operation of forwarding a page which is displayed on the screen, any operation of trying to further forward the page at a position where no more page forwarding is possible constitutes a "forbidden operation". Hereinafter, an operation of the electronic device in the case where a forbidden operation is attempted in connection with page forwarding will be described.

Figure 23:
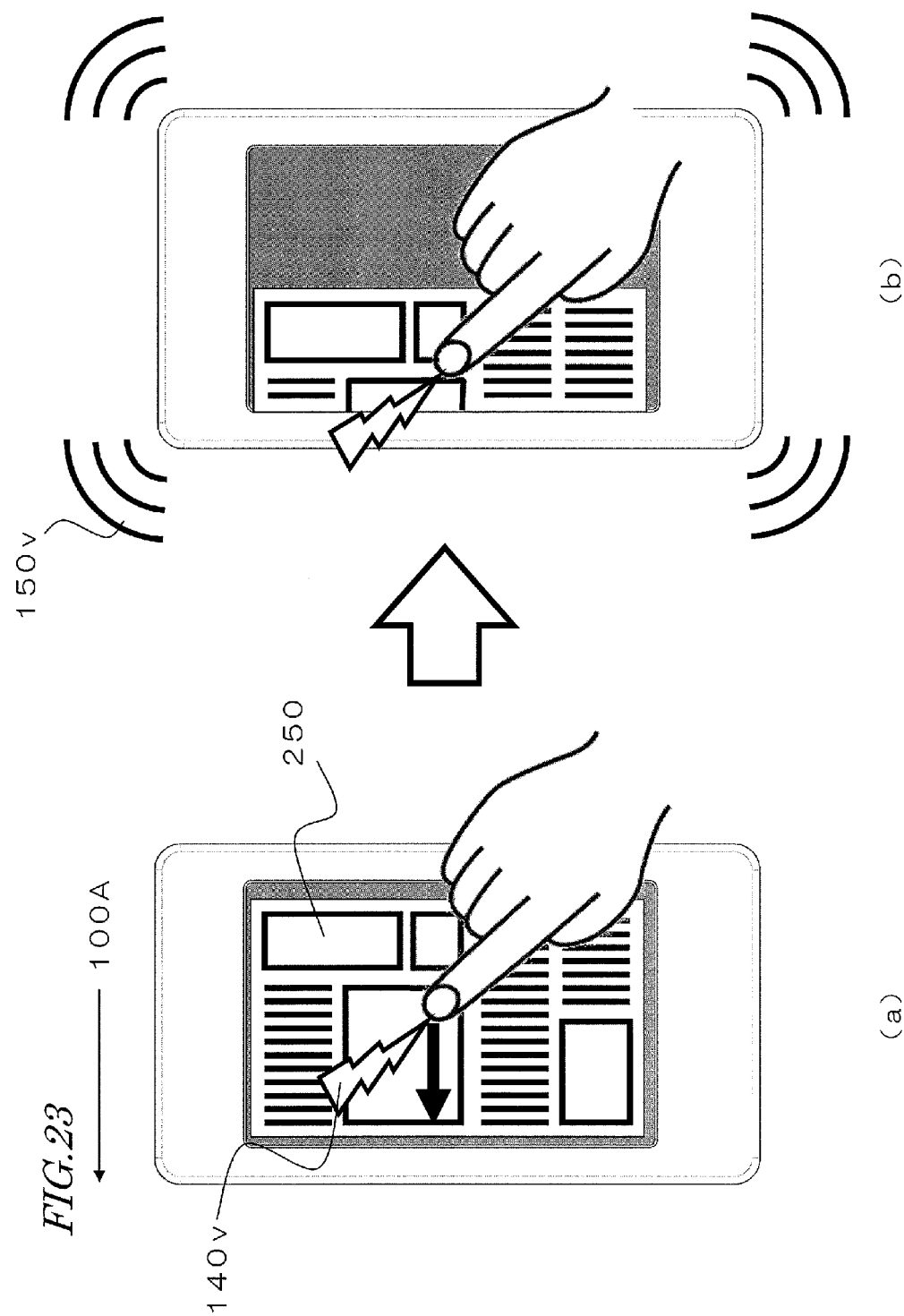
FIG. 23 is a schematic operational illustration of an electronic newspaper 250 according to Embodiment 3.

FIG. 23 is a schematic operational illustration of the electronic newspaper 250 shown in FIG. 9. FIG. 23(a) is a schematic diagram illustrating a state before the user performs page forwarding, and FIG. 23(b) is a schematic diagram illustrating a state where the user has performed page forwarding.

As shown in FIG. 23(a), page forwarding of the electronic newspaper 250 is achieved by sliding a displayed page of the electronic newspaper 250 on the display device 160. Specifically, it occurs as the user touches the touch screen panel 130 and performs a slide or flick operation in the direction in which he or she desires to forward the page. Herein, a page forwarding through a slide operation will be illustrated, as an example of slowly forwarding the page. It is assumed that no next page exists on the right-hand side of the displayed page.

Through a slide operation of the finger in the direction of arrow 100A from the state shown in FIG. 23(a), the displayed page of the electronic newspaper 250 is sent toward the left-hand side in the figure, thus reaching a state shown in FIG. 23(b).

However, since the currently-displayed electronic newspaper 250 has no next page on the right-hand side, the user is unable to forward the page any more to the left. This is a state where, based on the information that is displayed on the screen, the user is attempting an operation of trying to further forward the page at a position where no more page forwarding is possible (forbidden operation), although the slide operation in itself is a proper operation for the touch screen panel 130.

At this time, as shown in FIG. 23(b), the microcomputer 20 detects that the user is attempting a forbidden operation based on the displayed information on the screen, and based on this forbidden operation, drives the second vibrator 150 to vibrate the housing 105 of the electronic device 100, for example. Thus, the microcomputer 20 is able to inform the user via a tactile sensation that a forbidden operation has been attempted. Note that, when a forbidden operation is received, the vibration controller 33 may vibrate the first vibrator 140, instead of the second vibrator 150. Furthermore, when a forbidden operation is received, the vibration controller 33 may vibrate the first vibrator 140 or the second vibrator 150 at a higher intensity than in a click operation, a long tap operation, a slide operation, or a flick operation.

Moreover, forbidden operations may be classified into levels, and the microcomputer 20 may determine the level of a forbidden operation and change the vibrator to be vibrated based on the result of determination. For example, a permission-requiring operation that is attempted by a user who lacks the permission (forbidden operation) may be registered at level 10, whereas an operation of trying to forward the page at a position where no more page forwarding is possible (forbidden operation) may be registered at level 5. The vibration controller 33 may vibrate the first vibrator 140 and the second vibrator 150 for any forbidden operation of level 10, while the vibration controller 33 may vibrate only the second vibrator 150 for any forbidden operation of level 5.

Moreover, the vibration controller 33 may vary the magnitude of vibration depending on the level. In other words, for any higher-level forbidden operation that has been attempted, the vibration controller 33 may cause a greater vibration of either vibrator. The vibration controller 33 is able to vary the magnitude of vibration by controlling the levels of the voltages which are applied to the first vibrator 140 and the second vibrator 150.

Hereinafter, a flow of processes when a user has attempted a forbidden operation, where such displayed-image information is utilized, will be described.

<Flowchart of Touch Operation>

Figure 24:
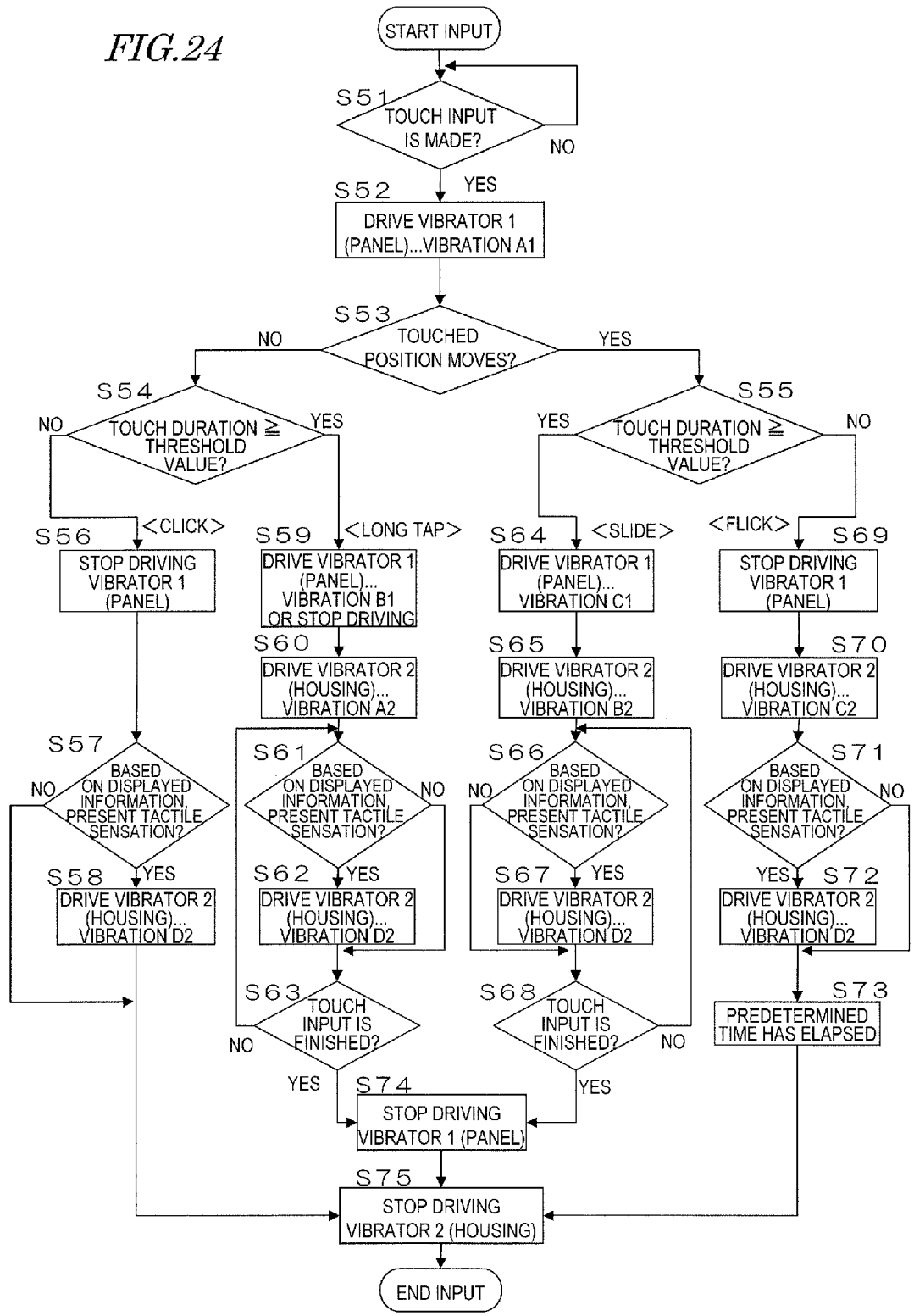
FIG. 24 is a flowchart showing a flow of touch operation according to Embodiment 3.

FIG. 24 is a flowchart showing a flow of touch operation according to the third embodiment, where "S" stands for "step".

After the input operation is started, at S51, the microcomputer 20 determines whether the user has made a touch input to the touch screen panel 130, based on information from the touch screen panel controller 31. If a touch has not been made, control again waits until a touch occurs.

If S51 finds that a touch input has been made, the process proceeds to S52. At S52, the vibration controller 33 controls the first vibrator 140 to present vibration A1 to the user. By feeling vibration A1 through the touching finger, the user is able to know that the finger has touched the touch screen panel 130.

After vibration A1 is presented, the process proceeds to S53. At S53, the microcomputer 20 determines whether a finger movement of the user has occurred on the touch screen panel 130. If the microcomputer 20 determines that no finger movement has occurred on the touch screen panel 130, the process proceeds to S54. At S54, the microcomputer 20 measures a duration for which the user has been touching the touch screen panel 130. Then, the microcomputer 20 determines whether the measured duration is equal to or greater than a predetermined threshold value. If the touch duration is less than the threshold value, it is distinguished as a click operation based on the classification shown in FIG. 7; if the touch duration is equal to or greater than the threshold value, it is distinguished as a long tap operation based on the classification shown in FIG. 7.

On the other hand, if at S53 the microcomputer 20 determines that there is a finger movement on the touch screen panel 130, the process proceeds to S55. At S55, the microcomputer 20 measures the touch duration on the touch screen panel 130. Then, the microcomputer 20 determines whether the measured duration is equal to or greater than a predetermined threshold value. If the touch duration is equal to or greater than the threshold value, it is distinguished as a slide operation based on the classification shown in FIG. 7; if the touch duration is less than the threshold value, it is distinguished as a flick operation based on the classification shown in FIG. 7.

<Click Operation>

Next, the flow of processes when the user's operation is distinguished as a click operation is described.

At S54, if the user's operation is distinguished as a click operation, the process proceeds to S56. At S56, the vibration controller 33 controls the first vibrator 140 to stop vibration A1. After vibration of the first vibrator 140 is stopped, the process proceeds to S57. At S57, first, information concerning the display screen is sent from the display controller 32 to the microcomputer 20. Based on the displayed information which has been sent, the microcomputer 20 determines whether it is necessary to present an alert vibration.

At S57, if the microcomputer 20 determines that an alert vibration needs to be presented, the process proceeds to S58. At S58, the vibration controller 33 controls the second vibrator 150 to present vibration D2 to the user. By feeling vibration D2 from the housing 105 of the electronic device 100, the user is able to know that an alert has been issued for the current touch operation. After vibration D2 is presented at S58, the process proceeds to S75.

On the other hand, if at S57 the microcomputer 20 determines that it is not necessary to present an alert vibration, S58 is skipped and the process proceeds to S75. At S75, the vibration controller 33 controls the second vibrator 150 to stop vibration. When vibration of the second vibrator 150 is stopped at S75, the microcomputer 20 determines that the user's input operation is finished.

<Long Tap Operation>

Next, the flow of processes when the user's operation is distinguished as a long tap operation is described.

If the user's operation is distinguished as a long tap operation at S54, the process proceeds to S59. At S59, the vibration controller 33 controls the first vibrator 140 to present vibration B1 to the user. Alternatively, the vibration controller 33 may stop vibration of the first vibrator 140. Thereafter, the process proceeds to S60. At S60, the vibration controller 33 controls the second vibrator 150 to present vibration A2 to the user. By feeling vibration A2 from the housing 105 of the electronic device 100, the user is able to know that an operation which is different from the aforementioned click operation has been made.

After vibration A2 is presented at S60, the process proceeds to S61. At S61, first, information concerning the display screen is sent from the display controller 32 to the microcomputer 20. Based on the displayed information which has been sent, the microcomputer 20 determines whether it is necessary to present an alert vibration.

At S61, if the microcomputer 20 determines that an alert vibration needs to be presented, the process proceeds to S62. At S62, the vibration controller 33 controls the second vibrator 150 to present vibration D2 to the user. By feeling vibration D2 from the housing 105 of the electronic device 100, the user is able to know that an alert has been issued for the current touch operation. After vibration D2 is presented at S62, the process proceeds to S63.

On the other hand, if at S61 the microcomputer 20 determines that it is not necessary to present an alert vibration, S62 is skipped and the process proceeds to S63. At S63, based on information from the touch screen panel controller 31, the microcomputer 20 determines whether the user's touch input on the touch screen panel 130 is finished. If the touch input is not finished, the process returns to S61 to again determine whether it is necessary to present an alert vibration, and vibration D2 is presented until the touch input is finished.

If S63 finds that touch input is finished, the process proceeds to S74. At S74, the vibration controller 33 controls the first vibrator 140 to stop vibration. After vibration of the first vibrator 140 is stopped, the process proceeds to S75. At S75, the vibration controller 33 controls the second vibrator 150 to stop vibration. When vibration of the second vibrator 150 is stopped, the microcomputer 20 determines that the user's input operation is finished.

<Slide Operation>

Next, the flow of processes when the user's operation is distinguished as a slide operation is described.

If the user's operation is distinguished as a slide operation at S55, the process proceeds to S64. At S64, the vibration controller 33 controls the first vibrator 140 to present vibration C1 to the user. After vibration C1 is presented to the user at S64, the process proceeds to S65. At S65, the vibration controller 33 controls the second vibrator 150 to present vibration B2 to the user. By feeling vibration B2 from the housing 105 of the electronic device 100, the user is able to know that an operation which is different from the aforementioned long tap operation has been made.

After vibration B2 is presented at S65, the process proceeds to S66. At S66, first, information concerning the display screen is sent from the display controller 32 to the microcomputer 20. Based on the displayed information which has been sent, the microcomputer 20 determines whether it is necessary to present an alert vibration.

At S66, if the microcomputer 20 determines that an alert vibration needs to be presented, the process proceeds to S67. At S67, the vibration controller 33 controls the second vibrator 150 to present vibration D2 to the user. By feeling vibration D2 from the housing 105 of the electronic device 100, the user is able to know that an alert has been issued for the current touch operation. After vibration D2 is presented at S67, the process proceeds to S68.

On the other hand, if at S66 the microcomputer 20 determines that it is not necessary to present an alert vibration, S67 is skipped and the process proceeds to S68. At S68, based on information from the touch screen panel controller 31, the microcomputer 20 determines whether the user's touch input on the touch screen panel 130 is finished. If the touch input is not finished, the process returns to S66 to again determine whether it is necessary to present an alert vibration, and vibration D2 is presented until the touch input is finished.

If S68 finds that touch input is finished, the process proceeds to S74. At S74, the vibration controller 33 controls the first vibrator 140 to stop vibration. After vibration of the first vibrator 140 is stopped, the process proceeds to S75. At S75, the vibration controller 33 controls the second vibrator 150 to stop vibration. When vibration of the second vibrator 150 is stopped, the microcomputer 20 determines that the user's input operation is finished.

<Flick Operation>

Next, the flow of processes when the user's operation is distinguished as a flick operation is described.

At S55, if the user's operation is distinguished as a flick operation, the process proceeds to S69. At S69, the vibration controller 33 controls the first vibrator 140 to stop vibration. After vibration of the first vibrator 140 is stopped, the process proceeds to S70. At S70, the vibration controller 33 controls the second vibrator 150 to present vibration C2 to the user. By feeling vibration C2 from the housing 105 of the electronic device 100, the user is able to know that an operation which is different from the aforementioned long tap operation or the slide operation has been made.

After vibration C2 is presented at S70, the process proceeds to S71. At S71, first, information concerning the display screen is sent from the display controller 32 to the microcomputer 20. Based on the displayed information which has been sent, the microcomputer 20 determines whether it is necessary to present an alert vibration.

At S71, if the microcomputer 20 determines that an alert vibration needs to be presented, the process proceeds to S72. At S72, the vibration controller 33 controls the second vibrator 150 to present vibration D2 to the user. By feeling vibration D2 from the housing 105 of the electronic device 100, the user is able to know that an alert has been issued for the current touch operation. After vibration D2 is presented at S72, the process proceeds to S73.

On the other hand, if at S71 the microcomputer 20 determines that it is not necessary to present an alert vibration, S72 is skipped and the process proceeds to S73. After the microcomputer 20 determines that a predetermined time has elapsed at S73, the process proceeds to S75. At S75, the vibration controller 33 controls the second vibrator 150 to stop vibration. When vibration of the second vibrator 150 is stopped, the microcomputer 20 determines that the user's input operation is finished.

<Example Vibration Presentations During Touch Operation>

Next, with reference to FIG. 25, the operation timing according to the third embodiment will be described.

Although the flowchart of FIG. 24 encompasses the four touch operations shown in FIG. 7, the slide operation in the operation example of FIG. 23 is taken for instance here.

The vibration timing during a slide operation according to the third embodiment is described with reference to FIG. 25.

FIG. 25 is an operation timing diagram during a slide operation according to the third embodiment, illustrating a relationship between touch input time, movement of the touched position, display screen information, and timing of driving the first vibrator 140 and the second vibrator 150. The addition of display screen information defines a difference over the first and second embodiments.

As shown in FIG. 25, in a slide operation according to the third embodiment, when the user touches the touch screen panel 130 with a finger, the first vibrator 140 is driven to vibrate the touch screen panel 130. If the finger movement on the touch screen panel 130 undergoes a predetermined displacement D0 or more, the second vibrator 150 is driven at a voltage V1 to vibrate the housing 105 of the electronic device 100. Then, if the display screen information produces information of e.g. a forbidden operation during the slide operation, the second vibrator 150 is driven at a voltage V2 to vibrate the housing 105 of the electronic device 100, voltage V2 being different from voltage V1. Thereafter, when the finger is lifted off the touch screen panel 130, driving of the first vibrator 140 and the second vibrator 150 is stopped.

Thus, in the present embodiment, depending on the display screen information, a vibrations which is different from those in usual operations is presented to the user. By providing an alert vibration to the user when a forbidden operation as described above is attempted, for example, an improved operability will be achieved.

Although the present embodiment illustrates the case where a forbidden operation is attempted, forbidden operations only constitute one example of the embodiment. For instance, the above-described processing would be applicable to any operation where a new vibration is presented based on display screen information which is indicative of a touch at a specific place on the display screen, or a move of a finger to a specific place.

Although the above description of the present embodiment is directed to a slide operation, this is not a limitation; the same also applies to the other touch screen panel operations.

Although the present embodiment illustrates that the vibration of the second vibrator 150 is altered based on display screen information, altered vibrations may instead be employed in the first vibrator 140, or in both of the first and second vibrators 140 and 150.

Although Embodiments 1 to 3 illustrate a construction where piezoelectric elements are used for the first vibrator 140 and an eccentric motor is used for the second vibrator 150, the first and second vibrators 140 and 150 are not limited thereto. For example, a construction where a weight reciprocates by utilizing electromagnetic force may be adopted, or the constructions of the first and second vibrators 140 and 150 may be exchanged. In other words, so long as desired vibration patterns are generated, the specific manner of obtaining them is not a stipulation in the present embodiment.

Although the above embodiments illustrate the touch screen panel 130 as a member covering the entire display surface of the display device 160, this is not a limitation. For example, a touch screen panel function may be provided only in a central portion of the display surface, while the peripheral portion may not be covered by anything that confers a touch screen panel function. In other words, the touch screen panel may at least cover the input operation area of the display section.

Although the above embodiments and variants thereof illustrate that the touch screen panel 130 covers at least a portion of the display surface of the display device 160, such that the display device 160 is disposed deeper, i.e., into the interior of the electronic device 100, than the touch screen panel 130 from the side on which user operations are performed. The reason for such disposition is that mainly an electrostatic type touch screen panel 130 was contemplated. However, so long as the user's operation is detectable, the touch screen panel 130 may be disposed deeper than the display device 160 from the side on which user operations are performed. In the case of a touch screen panel of an electromagnetic induction type utilizing a touch pen, the touch screen panel 130 may be disposed deeper than the display device 160 from the side on which user operations are performed. In that case, the first vibrator 140 may be placed in contact with the display device 160, so as to vibrate the display device 160. Note that the first vibrator 140 may vibrate at least one of the display device 160 and the touch screen panel 130.

Although the embodiments of the present disclosure illustrate operation keys of audio equipment or the like and an electronic newspaper as examples of displaying an operation screen, the display screen is not limited thereto. Any display screen is applicable that is capable of accepting touch screen panel operations of a user.

Thus, the electronic device 100 according to the embodiments presented herein includes a housing 105, a display device 160 for displaying an operation area, a touch screen panel 130 disposed so as to at least cover the operation area, a first vibrator 140 for vibrating the touch screen panel 130, a second vibrator 150 for vibrating the housing 105 (lower housing 120), and a vibration controller 33 for controlling vibration patterns of the first and second vibrators. The vibration controller 33 controls the vibration patterns of the first and second vibrators in accordance with a user's operation on the touch screen panel 130.

With such construction, the electronic device 100 is able to present various tactile sensations to the user.

Moreover, the vibration controller 33 may control the first and second vibrators to vary their vibration patterns depending on whether it is during the user's operation to the touch screen panel 130 or the operation has been finished.

With such construction, the electronic device 100 is able to present various tactile sensations during the user's operation and after the operation is finished.

Moreover, the vibration controller 33 may control the second vibrator 150 to vibrate during the user's operation to the touch screen panel 130, and control the first vibrator to vibrate after the user's operation to the touch screen panel 130 is finished.

With such construction, in the case where the user is holding the electronic device 100 with the left hand and operating the touch screen panel 130 with the right hand, for example, the housing 105 will vibrate even if the user's finger is lifted off the touch screen panel 130 after the operation is finished. Thus, the electronic device 100 is able to present various tactile sensations to the user.

Although the touch screen panel 130 and the display device 160 are illustrated as separate members in the above embodiments, this is not a limitation. For example, the touch screen panel 130 may be adhesively bonded to the display device 160. Alternatively, the display device 160 may have a function of detecting a touched position. In other words, it suffices if a touched position can be detected.

Although the above embodiments illustrate that the touch screen panel 130 is vibrated, this is not a limitation. For example, in the case where a cover glass is placed outside the touch screen panel 130, the cover glass may be vibrated. In other words, it suffices if any member that is touched by the user is vibrated.

The vibration control operation by the vibration controller 33 in the above embodiments may be implemented in hardware or software (a computer program). A computer program for realizing such a vibration control operation may be stored in an internal memory of the microcomputer 20 or a storage medium that is provided separately from the microcomputer 20. Moreover, such a computer program may be installed to the electronic device 100 from a storage medium (an optical disk, a semiconductor memory, etc.) on which it is recorded, or downloaded via telecommunication lines such as the Internet. The computer program is executed by the microcomputer 20 mounted in the electronic device 100, causing the component elements of the electronic device to operate in the manners described above.

The present disclosure is suitably used for any electronic device that generates vibration in response to a touch operation of a user.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the invention.

What is claimed is:

1. An electronic device comprising:
    a housing;
    a display configured to display an operation area;
    a touch screen panel configured to detect at least an input operation made by a user to the operation area;
    a first vibrator mounted to vibrate at least one of the display and the touch screen panel;
    a second vibrator mounted to vibrate the housing; and
    a vibration controller configured to control vibration of the first vibrator and the second vibrator, in accordance with the input operation of the user to the touch screen panel with a finger or touch input device, wherein,
    the vibration controller generates a first vibration by using the first vibrator to vibrate at least one of the display and the touch screen panel from a time when the touch screen panel is initially touched during the input operation to a time when the input operation includes a movement of the finger or touch input device on the touch screen panel of a predetermined displacement;
    the vibration controller generates a second vibration by using both the first vibrator and the second vibrator to vibrate the housing and at least one of the display and the touch screen panel from a time after the input operation includes the movement of the finger or touch input device on the touch screen panel of the predetermined displacement to a time when the user lifts the finger or touch input device off of the touch screen panel; and
    the vibration controller generates a third vibration by using only the second vibrator to vibrate the housing from the time when the user lifts the finger or touch input device off of the touch screen panel to a predetermined ending time.

2. The electronic device of claim 1, wherein the vibration controller vibrates the first vibrator and the second vibrator with different vibration patterns.

3. The electronic device of claim 2, wherein, during the input operation of the user, the vibration controller vibrates the first vibrator but does not vibrate the second vibrator.

4. The electronic device of claim 2, wherein, during the input operation of the user, the vibration controller first vibrates the first vibrator and then vibrates the second vibrator.

5. The electronic device of claim 4, wherein the vibration controller further vibrates the second vibrator while vibrating the first vibrator.

6. The electronic device of claim 1, wherein, during the input operation of the user, the vibration controller at least vibrates the first vibrator, and stops vibration of the first vibrator when the input operation of the user is finished.

7. The electronic device of claim 1, wherein the vibration controller vibrates the second vibrator after the input operation of the user is finished.

8. The electronic device of claim 6, wherein the vibration controller vibrates the second vibrator after the input operation of the user is finished.

9. The electronic device of claim 6, wherein the input operation of the user is an operation in which a position touched by the user moves on the operation area and which has a touch duration shorter than a predetermined threshold value.

10. The electronic device of claim 1, wherein, when the input operation of the user is a forbidden operation, the vibration controller vibrates at least one of the first vibrator and the second vibrator.

11. The electronic device of claim 1, wherein the first vibrator comprises a piezoelectric element, and the second vibrator comprises a motor.

12. A non-transitory computer-readable recording medium having stored therein a computer program to be executed by a computer mounted in an electronic device, the computer program causing the computer to perform operations comprising:
    displaying an operation area on a display;
    detecting at least an input operation made by a user to the operation area based on a signal from a touch screen panel;

vibrating at least one of the display and the touch screen panel with a first vibrator mounted to vibrate at least one of the display and the touch screen panel;

vibrating a housing of the electronic device with a second vibrator mounted to vibrate the housing; and controlling vibration of the first vibrator and the second vibrator in accordance with the input operation of the user to the touch screen panel with a finger or touch input device, such that, a first vibration is generated by using the first vibrator to vibrate at least one of the display and the touch screen panel from a time when the touch screen panel is initially touched during the input operation to a time when the input operation includes a movement of the finger or touch input device on the touch screen panel of a predetermined displacement;

a second vibration is generated by using both the first vibrator and the second vibrator to vibrate the housing and at least one of the display and the touch screen panel from a time after the input operation includes the movement of the finger or touch input device on the touch screen panel of the predetermined displacement to a time when the user lifts the finger or touch input device off of the touch screen panel; and a third vibration is generated by using only the second vibrator to vibrate the housing from the time when the user lifts the finger or touch input device off of the touch screen panel to a predetermined ending time.

13. An electronic device according to claim 1, wherein, the input operation is a flick operation, the flick operation is an operation where, after a touch input is made to the touch screen panel with the user, the user finishes touching the touch screen panel in a slide across the touch screen panel within a predetermined period.

* * * * *